(12) United States Patent
Shimoda

(10) Patent No.: US 6,396,988 B1
(45) Date of Patent: May 28, 2002

(54) OPTICAL WAVEGUIDE DEVICE AND METHOD OF FORMING THE SAME

(75) Inventor: Tsuyoshi Shimoda, Tokyo (JP)

(73) Assignee: NEC Corporation, Tokyo (JP)

( * ) Notice: Subject to any disclaimer, the term of this patent is extended or adjusted under 35 U.S.C. 154(b) by 82 days.

(21) Appl. No.: 09/639,747

(22) Filed: Aug. 14, 2000

(30) Foreign Application Priority Data

Aug. 13, 1999 (JP) .......................................... 11-229464
Aug. 13, 1999 (JP) .......................................... 11-229465

(51) Int. Cl.$^7$ ................................................ G02B 6/10
(52) U.S. Cl. ..................... 385/129; 385/131; 385/132; 385/141; 385/142; 385/144; 385/14
(58) Field of Search ................................. 385/129, 131, 385/132, 141, 142, 144, 14

(56) References Cited

U.S. PATENT DOCUMENTS

| | | | | |
|---|---|---|---|---|
| 4,328,469 A | * | 5/1982 | Scifres et al. | 372/45 |
| 4,755,014 A | * | 7/1988 | Stoll et al. | 350/96.12 |
| 5,210,801 A | * | 5/1993 | Fournier et al. | 385/14 |
| 6,093,941 A | * | 7/2000 | Russell et al. | 257/103 |

* cited by examiner

Primary Examiner—Brian Healy
Assistant Examiner—Sarah Woo
(74) Attorney, Agent, or Firm—Young & Thompson

(57) ABSTRACT

The present invention provides an optical waveguide device having a bottom cladding layer, a core and a top cladding layer, wherein a first submerge-preventing silica-based layer is further provided over the bottom cladding layer and under the core, and the first submerge-preventing silica-based layer is doped with at least one dopant and the first submerge-preventing silica-based layer is higher in softening temperature than the top cladding layer.

41 Claims, 21 Drawing Sheets

OPTICAL WAVEGUIDE DEVICE AND METHOD OF FORMING THE SAME

BACKGROUND OF THE INVENTION

The present invention relates to an optical wave guide device usable for optical communications and a method of forming the same.

As a great deal of rapid and worldwide propagation of internet, the requirement for commercialization of the optical communication devices has been on the increase. For example, 2.5 Gb/s-systems capable of transmissions with large capacity corresponding to thirty thousands telephone lines have been introduced into many areas As the amount of informations to be transmitted through the optical communication system has been on the increase, a wavelength-multiplexing system has been practiced. In the initial state, a few waves were multiplexed in wavelength. Recently, however, a high density wavelength-multiplexing system could be realized at about 80 wave level. For the high density wavelength-multiplexing system, there are important a multiplexer for multiplexing plural optical signals having different wavelengths to introduce the multiplexed optical signal into a single optical fiber or a single optical waveguide as well as a demultiplexer for demultiplexing the multiplexed optical signal into plural optical signals having different wavelengths to introduce the plural optical signals into plural optical fibers or plural optical wave guides. An array wave-guide grid has been attracted as one example. FIG. 1 is a diagram illustrative of a conventional array wave-guide grid. The conventional array wave-guide grid has an input waveguide 21, an array waveguide 23 connected through a first star-coupler 23 to the input waveguide 21 and an, output waveguide 25 connected through a second star-coupler 24 to the array waveguide 23. The array waveguide 23 comprises plural wave guides which are different in length of optical path by a constant difference and are arranged in array, so that the array waveguide 23 serves as a high-order diffraction-grating to exhibit multiplexing and demultiplexing functions. The array waveguide grid has already been commercialized and used in the existent optical communication system, wherein silica-based optical wave guides are formed over a silicon substrate or a silica substrate.

If the silica-based optical wave guides are formed over the silicon substrate, then a difference in thermal expansion coefficient between the silica-based optical wave guides and the silicon substrate causes a thermal stress which generates a birefringence or birefringence or double refraction in a silica-based layer of the silica-based optical wave guide. The birefringence or birefringence or double refraction causes a difference in propagation characteristics of the silica-based optical wave guide between in TE-mode and TM-mode. Particularly, this problem is serious to the device such as the array waveguide grid having a narrow distance of adjacent channel wavelengths and an abrupt transmission wavelength spectrum because a slight difference in wavelength characteristics between in TE-mode and TM-mode causes a large polarization dependency loss. In case of the array waveguide grid device with a frequency distance of 100 GHz, the polarization dependency loss is approximately proportional to a difference $\Delta\lambda(=\lambda_{TM}-\lambda_{TE})$ between a first transmission center wavelength $\lambda_{TM}$ in TM-mode and a second transmission center wavelength $\lambda_{TE}$ in TE-mode. A proportional constant may be estimated in the range of about a few dB/nm to 10 dB/nm unless any specific design technique is taken to planarize a peak portion of the transmission wavelength spectrum. If the silica-based optical waveguide, which have practically been manufactured, is applied to the above described array waveguide grid device, then the polarization dependency loss is extremely large, for example, not less than 1 dB since $\Delta\lambda$ is, normally not less than 0.1 nm. The actually used array wave guide grid device having the silicon substrate and the silica-based optical wave guide is further provided with a half-wavelength plate at a center of the array wave guide for canceling a difference in wavelength characteristic between polarized lights. FIG. 2 is a diagram illustrative of the conventional array wave guide grid device. The conventional array wave guide grid devices has an input waveguide 21, an array waveguide 23 connected through a first star-coupler 23 to the input waveguide 21 and an output waveguide 25 connected through a second star-coupler 24 to the array waveguide 23. The array waveguide 23 comprises plural wave guides which are different in length of optical path by a constant difference and are arranged in array, so that the array waveguide 23 serves as a high-order diffraction-grating to exhibit multiplexing and demultiplexing functions. The array waveguide 23 also has a half-wavelength plate 26 at its center position for canceling a difference in wavelength characteristic between polarized lights. The additional provision of the half-wavelength plate 26 suppresses the polarization dependency loss to not more than 0.2 dB which is not practical problem. It is, however, necessary to realize a highly accurate positioning of the half-wavelength plate 26 through many additional processes. The half-wavelength plate is somewhat expensive and makes it difficult to reduce the manufacturing cost of the conventional array wave guide grid device. In this circumstances, it had been required to reduce the polarization dependency loss without the half-wavelength plate. In order to reduce the polarization dependency loss without the half-wavelength plate, it is necessary to reduce the thermal stress to the silica-based layer of the optical wave guide. In order to reduce the thermal stress, it is effective that a dopant concentration of a dopant such as phosphorus or boron of the silica-based layer is adjusted so that the thermal expansion coefficient of the doped silica-based layer is made close to the thermal expansion coefficient of tie silicon substrate. In Japanese laid-open patent publication No. 8-136754, it is disclosed that in order to reduce the thermal stress, a cladding, layer is used to form the optical wave guide, wherein a dopant concentration of a dopant such as phosphorus or boron of the silica-based cladding layer is adjusted so that the thermal expansion coefficient of the silica-based cladding layer is made close to the thermal expansion coefficient of the Silicon substrate. FIG. 3 is a diagram illustrative of individual variations in thermal expansion coefficients of silica-based glasses doped with individual dopants, for example $P_2O_5$, $GeO_2$, $B_2O3$, $Al_2O_3$, F and $TiO_2$, over a dopant concentration. It is possible to reduce the difference in thermal expansion coefficient between the silica-based glass layer and the silicon substrate by controlling the dopant concentration.

In ELECTRONICS LETTERS vol. 33, No. 13, pp. 1173–1174, June 1997, it is disclosed that the array wave guide grid device has a reduced stress birefringence or double refraction, wherein the transmission center wavelength difference $\Delta\lambda$ is reduced from 0.19 nanometers to 0.03 nanometers.

In accordance with the conventional method, the silica-based film is formed by use of a high temperature heat treatment at a temperature of not less than 1200° C., for example, FHD method, wherein in order to reduce the stress, dopant concentrations of P and B are somewhat increased from the normal concentrations. The high temperature heat treatment causes separated phases of $P_2O_5$ and $B_2O_3$ in the silica-based glass layer. A large amount of deposition is formed in the layer or on a surface of the layer. The separated phases and the deposition serve for scattering the light, whereby the optical propagation loss is increased.

In the above circumstances, it had been required to develop an optical waveguide device with a reduced polarization dependency and an optical propagation loss as well as a method of forming the device by use of low temperature processes with an optimization to the dopant concentration in the layer of the stress in the layer The above conventional techniques further have the following disadvantages. In order to reduce the stress of the wave guide layer, the bottom cladding layer underlying the waveguide layer comprises the silica-based layer doped with P and B at high concentrations, for which reason if the high temperature heat treatment is carried out after the top cladding layer has been formed, then a core in the wave guide is dropped into the bottom cladding layer. Namely, it has been known that if the silica-based layer is heavily doped with the dopants such as P and B at high concentrations, then a softening temperature of the silica-based layer is dropped During the high temperature heat treatment cared out after the top cladding layer has been formed, the silica-based layer is made unstable so that the core of the wave guide is displaced or tilted, whereby the device performances are deteriorated. Particularly, in case of the array wave guide grid device, a slight displacement or a slight tilting of the core allows an increased cross-talk between adjacent channels. In Japanese laid-open patent publication. No. 5-157925, it is disclosed that in order to prevent the displacement or tilting of the core, a natural silica glass layer or a pure-silica glass layer free of any dopiest is formed on a top surface of the bottom cladding layer, wherein the top cladding layer is formed at a high temperature of not less than 1000° C., for which reason the natural silica glass layer is needed to have a sufficient thickness. The natural silica glass layer has a high softening temperature and a high rigidity but has a large stress for bending the substrate or for increasing the stress in the wave guide layer, resulting in the increase in the transmission center wavelength difference $\Delta\lambda$. Further, it is difficult to control the reflective index of the natural silica glass layer, for which reason the other reflective index of the cladding layer is adjusted to the reflective index of the natural silica glass layer by controlling the dopant concentration of the cladding layer and selecting the kind of the dopant. As a result, the freedoms of the kind of the dopant and he dopant concentration of the cladding layer are limited.

In the above circumstances, it had been required to develop a novel optical waveguide device with a reduced polarization dependency and high device performances and superior substrate in-plane uniformity as well as a method of forming the same.

Consequently, the above circumstances, it had been required to develop a novel optical waveguide device and a method of forming the same free from the above problems.

SUMMARY OF THE INVENTION

Accordingly, it is an object of the present invention to provide a novel optical waveguide device free from the above problems.

It is a further object of the present invention to provide a novel optical waveguide device with a reduced polarization dependency and high device performances and superior substrate in-plane uniformity.

It is a still further object of the present invention to provide a novel optical waveguide device with a reduced polarization dependency and an optical propagation loss as well as a method of forming the device by use of low temperature processes with an optimization to the dopant concentration in the layer of the stress in the layer.

It is yet a further object of the present invention to provide a novel method of forming an optical waveguide device free from the above problems.

It is further more object of the present invention to provide a novel method of forming an optical waveguide device with a reduced polarization dependency and high device performances and superior substrate in-plane uniformity.

It is more over object of the present invention to provide a novel method of forming an optical waveguide device with a reduced polarization dependency and an optical propagation loss as well as a method of forming the device by use of low temperature processes with an optimization to the dopant concentration in the layer of the stress in the layer.

The first present invention provides an optical waveguide device having a bottom cladding layer, a core and a top cladding layer, wherein a first submerge-preventing silica-based layer is further provided over the bottom cladding layer and under the core, and the first submerge-preventing silica-based layer is doped with at least one dopant and the first submerge-preventing silica-based layer is higher in softening temperature than the top cladding layer.

The second present invention provides a method of forming an optical waveguide device, comprising the steps of forming a bottom cladding layer over a silicon substrate; forming a first submerge-preventing silica-based layer over the bottom cladding layer; selectively forming a core on the first submerge-preventing silica-based layer; forming a top cladding layer, which comprises a first silica-based layer doped with at least one dopant selected from the group consisting of phosphorus and boron, on the core and over the first submerge-preventing silica-based layer by a chemical vapor deposition method, wherein the first silica-based layer is lower in softening temperature than the first submerge-preventing silica-based layer; and subjecting the first silica-based layer to a heat treatment in the range of 800–1000° C.

The third present invention provides an optical waveguide device having a bottom cladding layer, a core and a top cladding layer, wherein at least the top cladding layer comprises a first silica-based layer doped with at least one dopant so that the first silica-based layer has a total dopant concentration in the range of 8.8 percents by weight to 15 percents by weight, and the first silica-based layer has a difference of not more than 0.03 nanometers in transmission center wavelength which depends upon polarization of the optical waveguide device.

The fourth present invention provides a method of forming an optical waveguide device comprising the steps of: forming a bottom cladding layer over a silicon substrate, selectively forming a core on the bottom cladding layer; forming a top cladding layer, which comprises a first silica-based layer doped with at least one dopant selected from the group consisting of phosphorus and boron, on the core and over the bottom cladding layer by a chemical vapor deposition method; and subjecting the first silica-based layer to a beat treatment in the range of 800–1000° C.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

DISCLOSURE OF THE INVENTION

Figure 1:
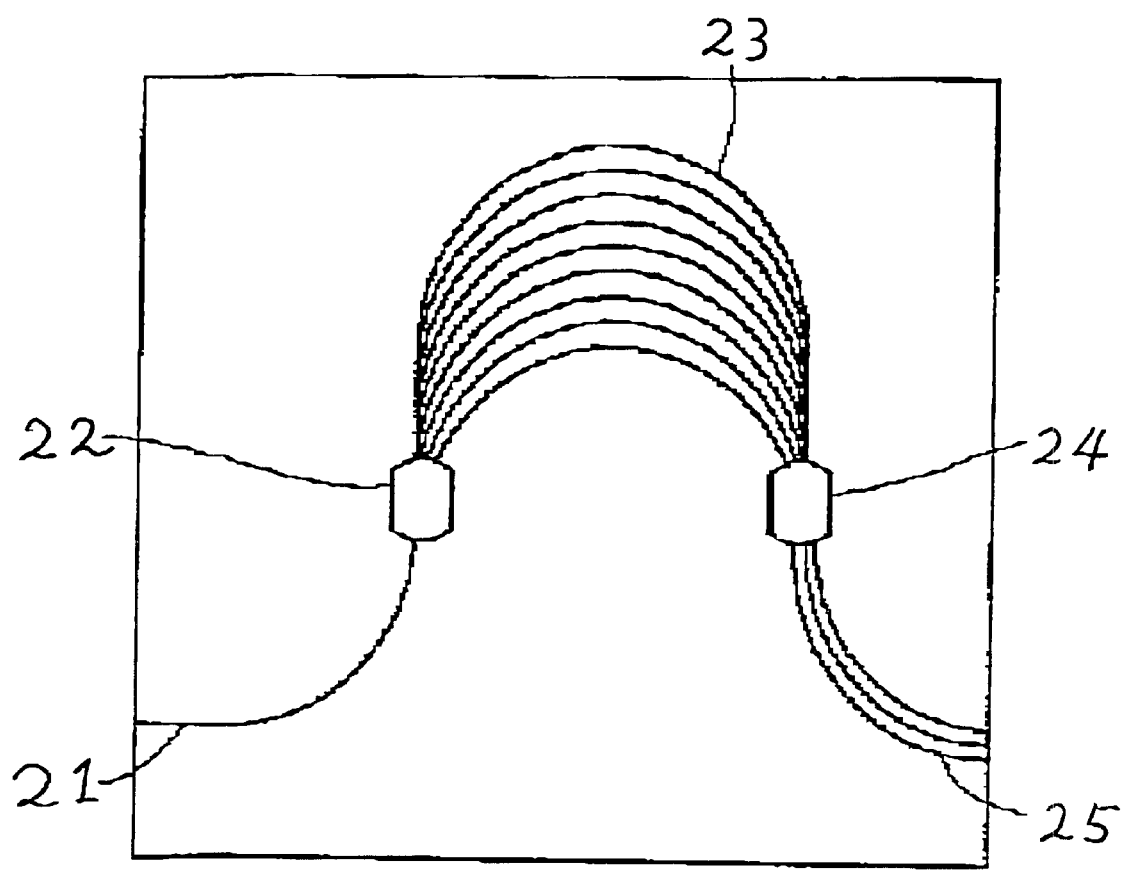
FIG. 1 is a diagram illustrative of a conventional array wave-guide grid.
Figure 2:
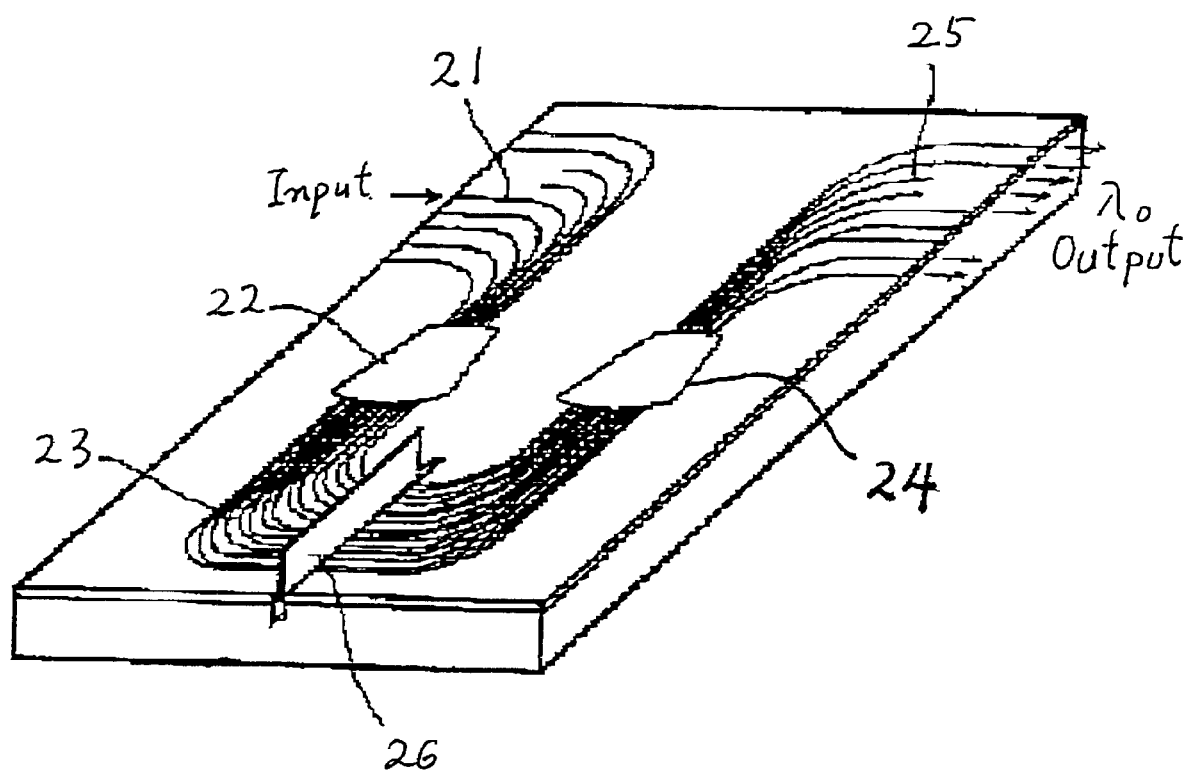
FIG. 2 is a diagram illustrative of the conventional array wave guide grid device.
Figure 3:
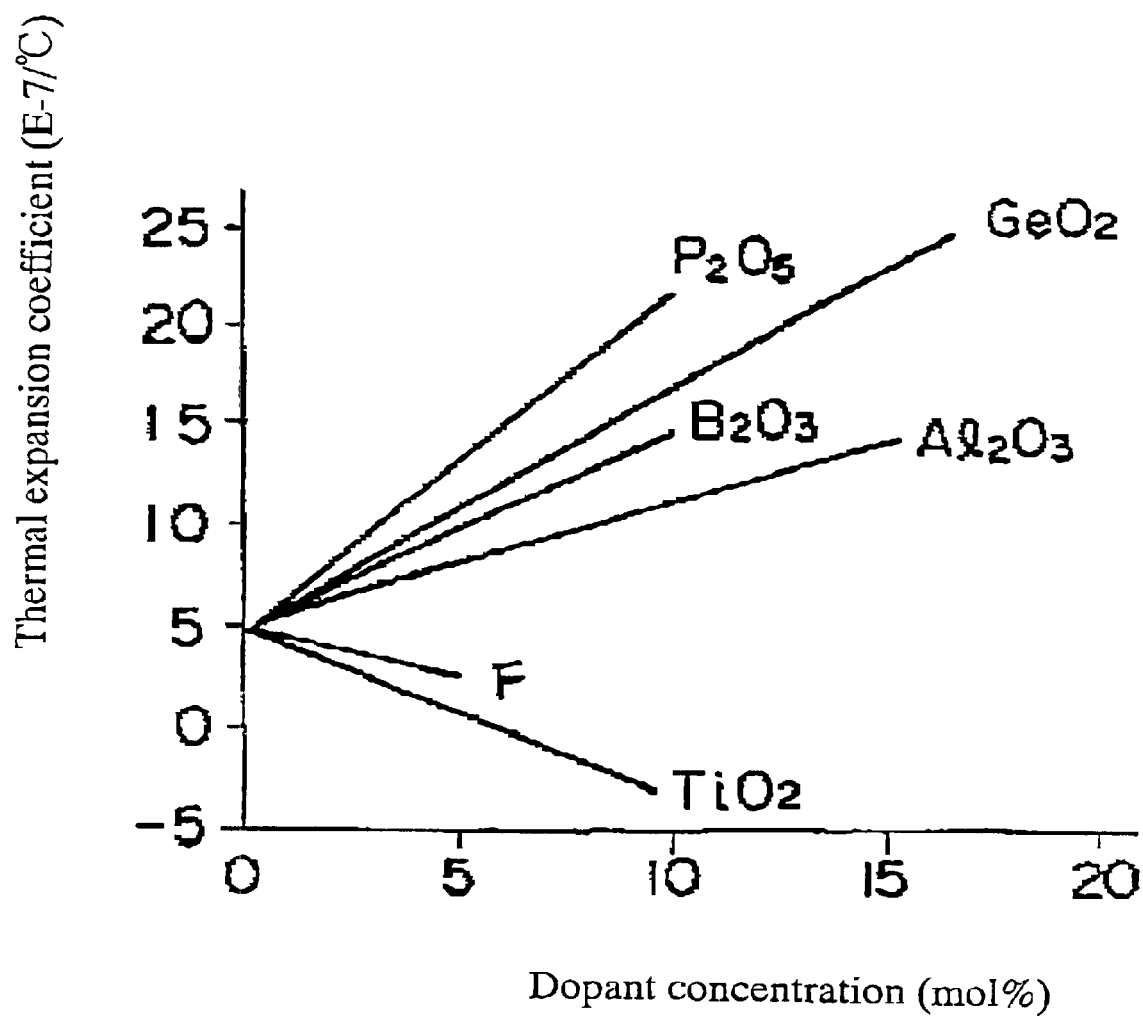
FIG. 3 is a diagram illustrative of individual variations in thermal expansion coefficients of silica-based glasses doped with individual dopants, for example $P_2O_5$, $GeO_2$, $B_2O_3$, $Al_2O_3$, F and $TiO_2$, over a dopant concentration.

The first present invention provides an optical waveguide device having a bottom cladding layer, a core and a top cladding layer, wherein a first submerge-preventing silica-based layer is further provided over the bottom cladding layer and under the core, and the first submerge-preventing silica-based layer is doped with at least one dopant and the first submerge-preventing silica-based layer is higher in softening temperature than the top cladding layer.

In accordance with the first present invention, the first submerge-preventing silica-based layer is additionally provided under the core and over the bottom cladding layer, wherein the first submerge-preventing silica-based layer is higher in softening temperature than the top cladding layer, and the first submerge-preventing silica-based layer is adjustable in both refractive index and stress, whereby the first submerge-preventing silica-based layer prevents the core from being submerged into the bottom cladding layer during the low temperature heat treatment. The first submerge-preventing silica-based layer also prevents the core from tilting. Further, the first submerge-preventing silica-based layer also prevents any displacement of the core from the original position. The first submerge-preventing silica-based layer improves the substrate in-plane uniformity in shape of the core. Consequently, the first submerge-preventing silica-based layer improves the device performances and also increases the yield of the device.

It is preferable that the at least one dopant is selected from the group consisting of phosphorus and boron.

It is also preferable that the first submerge-preventing silica-based layer has a thickness in the range of 0.2 micrometers to 5 micrometers.

It is also preferable to further comprise a second submerge-preventing silica-based layer between the first submerge-preventing silica-based layer and the bottom cladding layer, wherein the second submerge-preventing silica-based layer is doped with at least one dopant and the second submerge-preventing silica-based layer is higher in softening temperature than the first submerge-preventing silica-based layer.

The second submerge-preventing silica-based layer is further provided under the first submerge-preventing silica-based layer and over the bottom cladding layer, wherein the second submerge-preventing silica-based layer is higher in softening temperature than the first submerge-preventing silica-based layer to form laminations of the first and second submerge-preventing silica-based layers, and the first and second submerge-preventing silica-based layers are adjustable in both refractive index and stress, whereby the first and second submerge-preventing silica-based layers prevent the core from being submerged into the bottom cladding layer during the low temperature heat treatment. The first and second submerge-preventing silica-based layers also prevent the core from tilting. Further, the first and second submerge-preventing silica-based layers also prevent any displacement of the core from the original position. The first and second submerge-preventing silica-based layers also improve the substrate in-plane uniformity in shape of the core. Consequently, the first and second submerge-preventing silica-based layers improve the device performances and also increases the yield of the device.

It is further preferable that the at least one dopant is selected from the group consisting of phosphorus and boron.

It is also preferable that the second submerge-preventing silica-based layer has a thickness in the range of 0.1 micrometer to 0.3 micrometers.

It is also preferable that at least the top cladding layer comprises a first silica-based layer doped with at least one dopant.

It is further preferable that the at least one dopant is selected from the group consisting of phosphorus and boron.

It is also preferable that the first silica-based layer has a total weight concentration of the at least one dopant in the range of 6.2 percents by weight to 15 percents by weight and the first silica-based layer has a layer-stress of not more than 3E7 Pa.

It is also preferable that the first silica-based layer has a total weight concentration of the at least one dopant in the range of 8.8 percents by weight to 15 percents by weight and the first silica-based layer has a difference of not more than 0.03 nanometers in transmission center wavelength which depends upon polarization of the optical waveguide device.

It is also preferable that the first silica-based layer has a total weight concentration of the at least one dopant in the range of 12 percents by weight to 14 percents by weight and the first silica-based layer has a layer-stress of not more than 8.3E6 Pa.

It is also preferable that the first silica-based layer has a first weight concentration of phosphorus in the range of 4 percents by weight to 12 percents by weight, and a second weight concentration of boron in the range of 3 percents by weight to 11 percents by weight.

It is also preferable that each of the top and bottom cladding layers comprises the first silica-based layer.

It is also preferable that the optical waveguide device is an optical waveguide interferometer.

It is also preferable that the optical waveguide device is an array waveguide grid optical multiplexing and demultiplexing device which has an array waveguide region having both ends coupled with a first slab waveguide region in an input side and a second slab waveguide region in an output side.

It is also preferable that the optical waveguide device is formed over a silicon substrate.

The second present invention provides a method of forming an optical waveguide, device, comprising the steps of: forming a bottom cladding layer over a silicon substrate; forming a first submerge-preventing silica-based layer over the bottom cladding layer; selectively forming a core ton the first submerge-preventing silica-based layer; forming a top cladding layer, which comprises a first silica-based layer doped with at least one dopant selected from the group consisting of phosphorus and baron, on the core and over the first submerge-preventing silica-based layer by a chemical vapor deposition method, wherein the first silica-based layer is lower in softening temperature than the first submerge-preventing silica-based layer; and subjecting the first silica-based layer to a heat treatment in the range of 800–1000° C.

In accordance with the second present invention, the first submerge-preventing silica-based layer is additionally provided under the core and over the bottom cladding layer, wherein the first submerge-preventing silica-based layer is higher in softening temperature than the top cladding layer, and the first submerge-preventing silica-based layer is adjustable in both refractive index and stress, whereby the first submerge-preventing silica-based layer prevents the core from being submerged into the bottom cladding layer during the low temperature heat treatment. The first submerge-preventing silica-based layer also prevents the core from tilting. Further, the first submerge-preventing silica-based layer also prevents any displacement of the core from the original position. The first submerge-preventing silica-based layer improves the substrate in-plane uniformity in shape of the core. Consequently, the first submerge-preventing silica-based layer improves the device performances and also increases the yield of the device.

It is preferable that the bottom cladding layer also comprises the first silica-based layer.

It is also preferable that a total dopant concentration of the first silica-based layer is in the range of 6.2 percents by weight to 15 percents by weight, and the first silica-based layer has a layer-stress of not more than 3E7 Pa.

It is also preferable that a total dopant concentration of the first silica-based layer is in the range of 8.8 percents by weight to 15 percents by weight, and the first silica-based layer has a difference of not more than 0.03 nanometers in transmission center wavelength which depends upon polarization of the optical waveguide device.

It is also preferable to further comprise the step of after the bottom cladding layer has been formed, forming a second submerge-preventing silica-based layer on the bottom cladding layer before the first submerge-preventing silica-based layer is then formed on the second submerge-preventing silica-based layer, wherein the second submerge-repenting silica-based layer is higher in softening temperature than the first submerge-preventing silica-based layer.

The second submerge-preventing silica-based layer is further provided under the first submerge-preventing silica-based layer and over the bottom cladding layer, wherein the second submerge-preventing silica-based layer is higher in softening temperature than the first submerge-preventing silica-based layer to form laminations of the first and second submerge-preventing silica-based layers, and the first and second submerge-preventing silica-based layers are adjustable in both refractive index and stress, whereby the first and second submerge-preventing silica-based layers prevent the core from being submerged into the bottom cladding layer during the low temperature heat treatment. The first and second submerge-preventing silica-based layers also prevent the core from tilting. Further, the first and second submerge-preventing silica-based layers also prevent any displacement of the core from the original position. The first and second submerge-preventing silica-based layers also improve the substrate in-plane uniformity in shape of the core. Consequently, the first and second submerge-preventing silica-based layers improve the device performances and also increases the yield of the device.

It is also preferable that the first silica-based layer has a first weight concentration of phosphorus in the range of 4 percents by weight to 12 percents by weight, and a second weight concentration of boron in the range of 3 percents by weight to 11 percents by weight.

It is also preferable that the first silica-based layer is grown at a temperature of 400° C. and the heat treatment is carried out at a temperature of 880° C., and the total dopant concentration of the first silica-based layer is in the range of 12 percents by weight to 14 percents by weight.

It is also preferable that each of the top and bottom cladding layers is formed by an atmospheric pressure chemical vapor deposition method by decomposing tetraethylolsosilicate with ozone.

The third present invention provides an optical waveguide device having a bottom cladding layer, a core and a top cladding layer, wherein at least the top cladding layer comprises a first silica-based layer doped with at least one dopant so that the first silica-based layer has a total dopant concentration in the range of 8.8 percents by weight to 15 percents by weight, and the first silica-based layer has a difference of not more than 0.03 nanometers in transmission center wavelength which depends upon polarization of the optical waveguide device.

In accordance with the third present invention, at least the top cladding layer comprises the first silica-based layer doped with at least one dopant selected from the group consisting of phosphorus and boron to suppress separated phases of $P_2O_5$ or $B_2O_3$ and also suppress deposition, even if the dopants such as P and B are doped at high concentrations, whereby the optical propagation loss is reduced. The top cladding layer or both the top and bottom cladding layers comprises a silica-based layer doped with at least one dopant selected from the group consisting of phosphorus and boron to form a boro-phospho-silicate glass layer, wherein the silica-based layer has a total dopant concentration in the range of 8.8 percents by weight by 15 percents by weight, whereby the top cladding layer or both the top and bottom cladding layers are made closer in thermal expansion coefficient to the silicon substrate. Namely, a difference in thermal expansion coefficient between either the top and bottom cladding layers or the top cladding layer and the silicon substrate is reduced. The reduction in thermal expansion coefficient between either the top and bottom cladding layers or the top cladding layer and the silicon substrate also reduces the stress generated in the silica-based optical wave guide layer. As a result, the optical wave guide device has a reduced polarization dependency and a reduced optical propagation loss. The optical wave guide device is suitable for the optical interferometer such as the array waveguide grid device.

It is preferable that the bottom cladding layer is higher in softening temperature than the top cladding layer.

It is also preferable that the at least one dopant is selected from the group consisting of phosphorus and boron.

It is further preferable that a total concentration of phosphorus and boron of the first silica-based layer is the range of 12 percents by weight to 14 percents by weight, and the first silica-based layer has a layer-stress of not more than 8.3E6 Pa.

It is also preferable that the bottom cladding layer comprises a second silica-based layer doped with phosphorus.

It is further preferable that the second silica-based layer is further doped with germanium in addition to phosphorus.

It is also preferable that the optical waveguide device is an optical waveguide interferometer.

It is also preferable that the optical waveguide device is an array waveguide grid optical multiplexing and demultiplexing device which has an array waveguide region having both ends coupled with a first slab waveguide region in an input side and a second slab waveguide region in an output side.

The fourth present invention provides a method of forming an optical waveguide device comprising the steps of: forming a bottom cladding layer over a silicon substrate; selectively forming a core on the bottom cladding layer; forming a top cladding layer, which comprises a first silica-based layer doped with at least one dopant selected from the group consisting of phosphorus and boron, on the core and over the bottom cladding layer by a chemical vapor deposition method; and subjecting the first silica-based layer to a heat treatment in the range of 800–1000° C.

In accordance with the fourth present invention, at least the top cladding layer comprises the first silica-based layer doped with at least one dopant selected from the group consisting of phosphorus and boron to suppress separated phases of $P_2O_5$ or $B_2O_3$ and also suppress deposition, even if the dopants such as P and B are doped at high concentrations, whereby the optical propagation loss is reduced. The top cladding layer or both the top and bottom cladding layers comprises a silica-based layer doped with at least one dopant selected from the group consisting of phosphor and boron to form a boro-phospho-silicate glass layer, wherein the silica-based layer has a total dopant concentration in the range of 8.8 percents by weight by 15 percents by weight, whereby the top cladding layer or both the top and bottom cladding layers are made closer in thermal expansion coefficient to the silicon substrate. Namely, a difference in thermal expansion coefficient between either the top and bottom cladding layers or the top cladding layer and the silicon substrate is reduced. The reduction in thermal expansion coefficient between either the top and bottom cladding layers or the top cladding layer and the silicon substrate also reduces the stress generated in the silica-based optical wave guide layer. As a result, the optical wave guide device has a reduced polarization dependency and a reduced optical propagation loss. The optical wave guide device is suitable for the optical interferometer such as the array waveguide grid device.

It is preferable that the bottom cladding layer also comprises the first silica-based layer.

It is also preferable that the first silica-based layer has a total dopant concentration the range of 62 percents by weight to 15 percents by weight, and the first silica-based layer has a layer-stress of not more than 3E7 Pa.

It is also preferable that the first silica-based layer has a total dopant concentration in the range of 8.8 percents by weight to 15 percents by weight, and the first silica-based layer has a difference of not more than 0.03 nanometers in transmission center wavelength which depends upon polarization of the optical waveguide device.

It is also preferable that the first silica-based layer has a first weight concentration of phosphorus in the range of 4 percents by weight to 12 percents by weight, and a second weight concentration of boron in the range of 3 percents by weight to 11 percents by weight.

It is also preferable that the first silica-based layer is grown at a temperature of 400° C. and the beat treatment is carried out at a temperature of 880° C., and the total dopant concentration of the first silica-based layer is in the range of 12 percents by weight to 14 percents by weight.

It is also preferable that each of the top and bottom cladding layers is formed by an atmospheric pressure chemical vapor deposition method by decompiosing tetraethylolsosilicate with ozone.

It is also preferable that the bottom cladding layer comprises a second silica-based layer doped with phosphorus.

It is further preferable that the second silica-based layer is further doped with germanium in addition to phosphorus.

In accordance with the fourth present invention, the first silica-based layer is grown at a low temperature to suppress separated phases of $P_2O_5$ or $B_2O_3$ and also suppress deposition, even if the dopants such as P and B are doped it high concentrations, whereby the optical propagation loss is reduced. The top cladding layer or both the top and bottom cladding layers comprises a silica-based layer doped with at least one dopant selected from the group consisting of phosphorus and boron to form a boro-phospho-silicate glass layer, wherein the silica-based layer has a total dopant concentration in the range of 8.8 percents by weight by 15 percents by weight, whereby the top cladding layer or both the top and bottom cladding layers are made closer in thermal expansion coefficient to the silicon substrate. Namely, a difference in thermal expansion coefficient between either the top and bottom cladding layers or the top cladding layer and the silicon substrate is reduced. The reduction in thermal expansion coefficient between either the top and bottom cladding layers or the top cladding layer and the silicon substrate also reduces the stress generated in the silica-based optical wave guide layer. As a result, the optical wave guide device has a reduced polarization dependency and a reduced optical propagation loss. The optical wave guide device is suitable for the optical interferometer such as the array waveguide grid device.

A single silica-based layer doped with phosphorus and boron was deposited on a silicon substrate by an atmospheric pressure chemical vapor deposition method, wherein an organic source of tetraethylolsosilicate ($Si(OC_2H_5)_4$) is decomposed with ozone ($O_3$). The silica-based layer comprises a boro-phospho-silicate glass layer ($BPSG:SiO_2+P_2O_5+B_2O_3$). The silica-based layer has a thickness of 15 micrometers. An anneal was carried out under various conditions "A", "B", "C", "D", and "E". Table 1 shows individual growth temperatures, anneal temperatures and anneal times of the anneal process.

TABLE 1

| Conditions | growth temp. (° C.) | anneal temp. (° C.) | anneal time (h) |
|---|---|---|---|
| "A" | 380 | 800 | 0.5 |
| "B" | 400 | 800 | 0.5 |
| "C" | 400 | 880 | 3 |
| "D" | 450 | 880 | 3 |
| "E" | 400 | 1000 | 3 |

Figure 4:
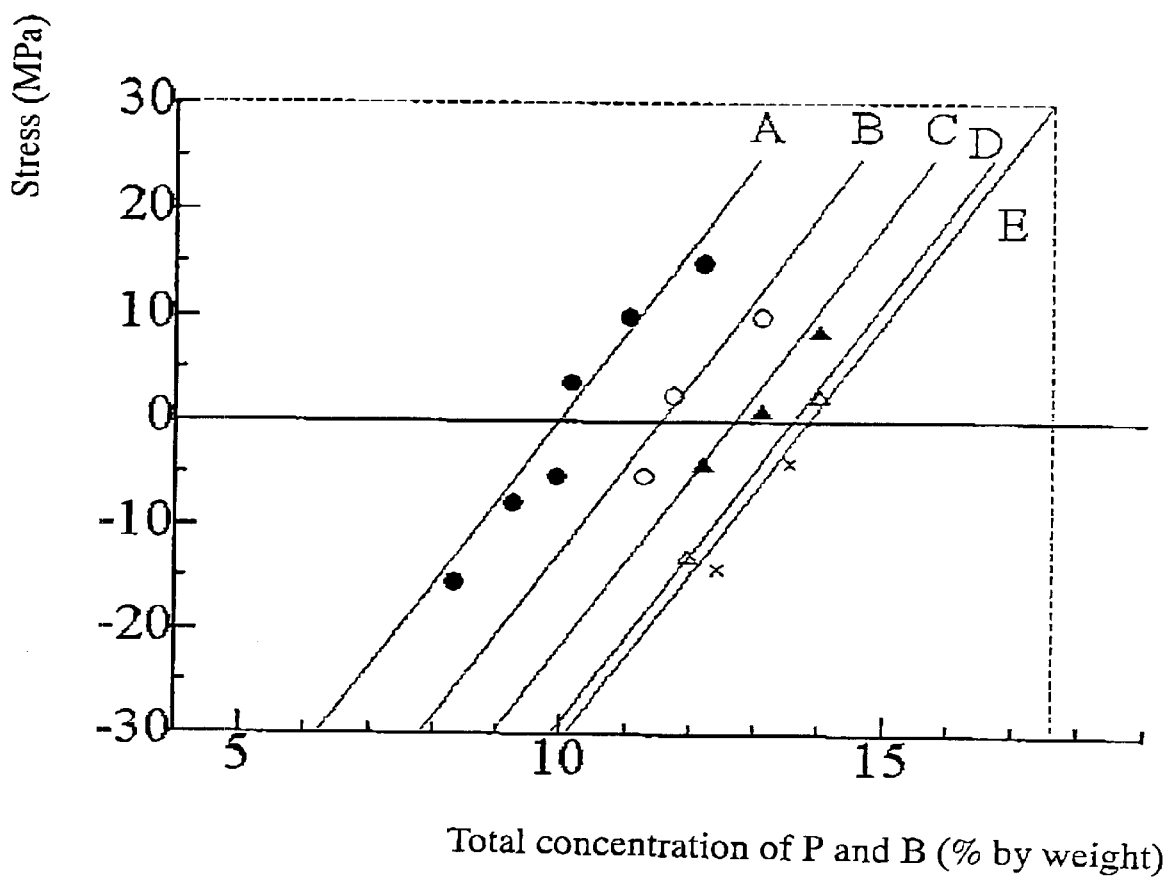
FIG. 4 is a diagram illustrative of variations in film-stress of the above silica-based film over a total dopant concentration of phosphorus and boron when the anneal is carried out to the silica-based film under each of the above various conditions shown on Table 1, wherein the pulse or positive represents a tension whilst the minus or negative represents a compression.

FIG. 4 is a diagram illustrative of variations in film-stress of the above silica-based film over a total dopant concentration of phosphorus and boron when the anneal is carried out to the silica-based film under each of the above various conditions shown on Table 1, wherein the pulse or positive represent a tension whilst the minus or negative represents a compression. The stress of the layer was measured by measuring an amount of bending the substrate.

As shown in FIG. 4, the stress is proportional to the total dopant concentration of phosphorus and boron under each of the various conditions. This means that it is possible to control the stress of the silica-based layer by controlling the total dopant concentration of phosphorus and boron. The stress generated in the silica-based layer depends upon the various conditions or process parameters, for example, the growth temperature, the anneal temperature and the anneal time. In accordance with the various process parameters, a total dopant concentration may be decided.

It is necessary for the array waveguide grid device that the polarization dependency loss is suppressed within 0.3 dB. The polarization dependency loss is approximately proportional to the difference $\Delta\lambda$ in transmission center wavelength between the TM-mode and TE-mode, wherein a proportional constant is in the range of a few dB/nm to 10 db/nm. It is necessary that the absolute value of the difference $\Delta\lambda$ in transmission center wavelength between the TM-mode and TE-mode is suppressed within 0.03 nanometers. Since $\Delta\lambda=\Delta L/m\times B$, then $\Delta L/m\times B \leq 0.03$ nanometers, where $\Delta L$ is the difference in optical path, m is the order of diffraction and B is, the birefringence or double refraction or a difference in equivalent refraction between the TE-mode and the TM-mode. If $\Delta L=60.73$ micrometers, and m=57, then since $B-K\sigma$, where it is necessary that $\sigma \leq 8.3E6$ Pa, where $\sigma$ is the film stress and K is the optical elastic constant, and K–3.4E–12/Pa. In order to optimize the difference $\Delta\lambda$ in transmission center wavelength between the TM-mode and TE-mode, not only the film stress of the single layer but also heat history and layered structure of the device should be considered.

Figure 5:
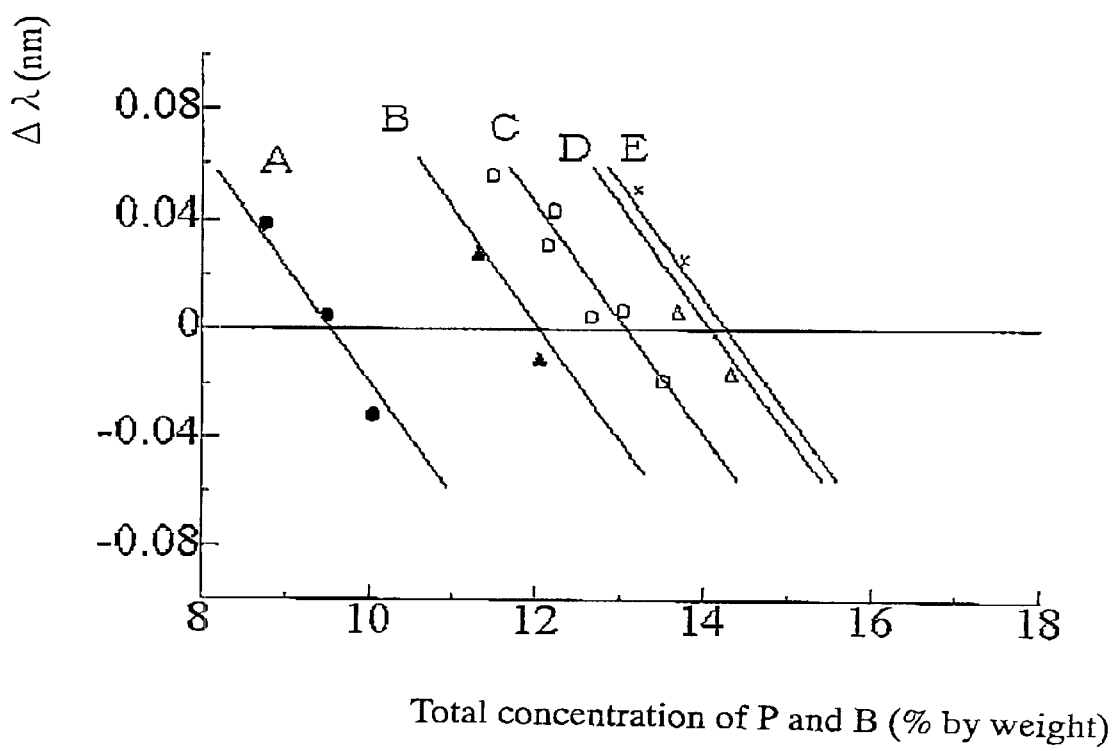
FIG. 5 is a diagram illustrative of variations in the difference $\Delta\lambda$ transmission center wavelength between the TM-mode and TE-mode of the above silica-based film over a total dopant concentration of phosphorus and boron when the anneal is carried out to the silica-based film under each of the above various conditions shown on Table 1.

FIG. 5 is a diagram illustrative of variations in the difference $\Delta\lambda$ in transmission center wavelength between the TM-mode and mode of the above silica-based film over a total dopant concentration of phosphorus and boron when the anneal is carried out to the silica-based film under each of the above various conditions shown on Table 1. The difference $\Delta\lambda$ in transmission center wavelength between the TM-mode and TE-mode of the above silica-based film is proportional to the total dopant concentration of phosphorus and boron under each of the individual conditions. If the difference $\Delta\lambda$ in transmission center wavelength between the TM-mode and TE-mode is almost zero, then this means that the optical waveguide device is almost independent from the polarization. The control of the total dopant concentration of phosphorus and boron makes it possible to form or obtain the optical waveguide device which is almost independent from the polarization. If the growth temperature is in the range of 380–450° C., and the anneal temperature is in the range of 800–1000° C., then the total dopant concentration of phosphorus and boron is controlled in the range of 8.8 percents by weight to 15 percents by weight so as to suppress the transmission center wavelength difference $\Delta\lambda$ within 0.03 nanometers, whereby the optical wave guide device is almost independent from the polarization.

If the optical wave guide device is free of any optical interferometer, then it is necessary to suppress the film stress within 3E7 Pa. In order to suppress the film stress within 3E7 Pa, it is necessary that the total dopant is concentration of phosphorus and boron is controlled in the range of 6.2 percents by weight to 17.6 percents by weight.

As described above, the film stress depends upon the total dopant concentration of phosphorus and boron but does not depend upon a ratio in dopant concentration of phosphorus to boron. Also, the difference $\Delta\lambda$ in transmission center wavelength between the TM-mode and TE-mode of the above silica-based film depends upon the total dopant concentration of phosphorus and boron but does not depend upon a ratio in do ant concentration of phosphorus to boron.

The maximum anneal temperature was set at 1000° C. to prevent the optical transmission loss. The silica-based layer is heavily doped with phosphorus and boron at high dopant concentrations so that the thermal expansion coefficient of the silica-based layer is made close to the thermal expansion coefficient of the silicon substrate. If, contrary to the present invention, the separated phases and the segregation are caused which increase the optical propagation loss.

Figure 6:
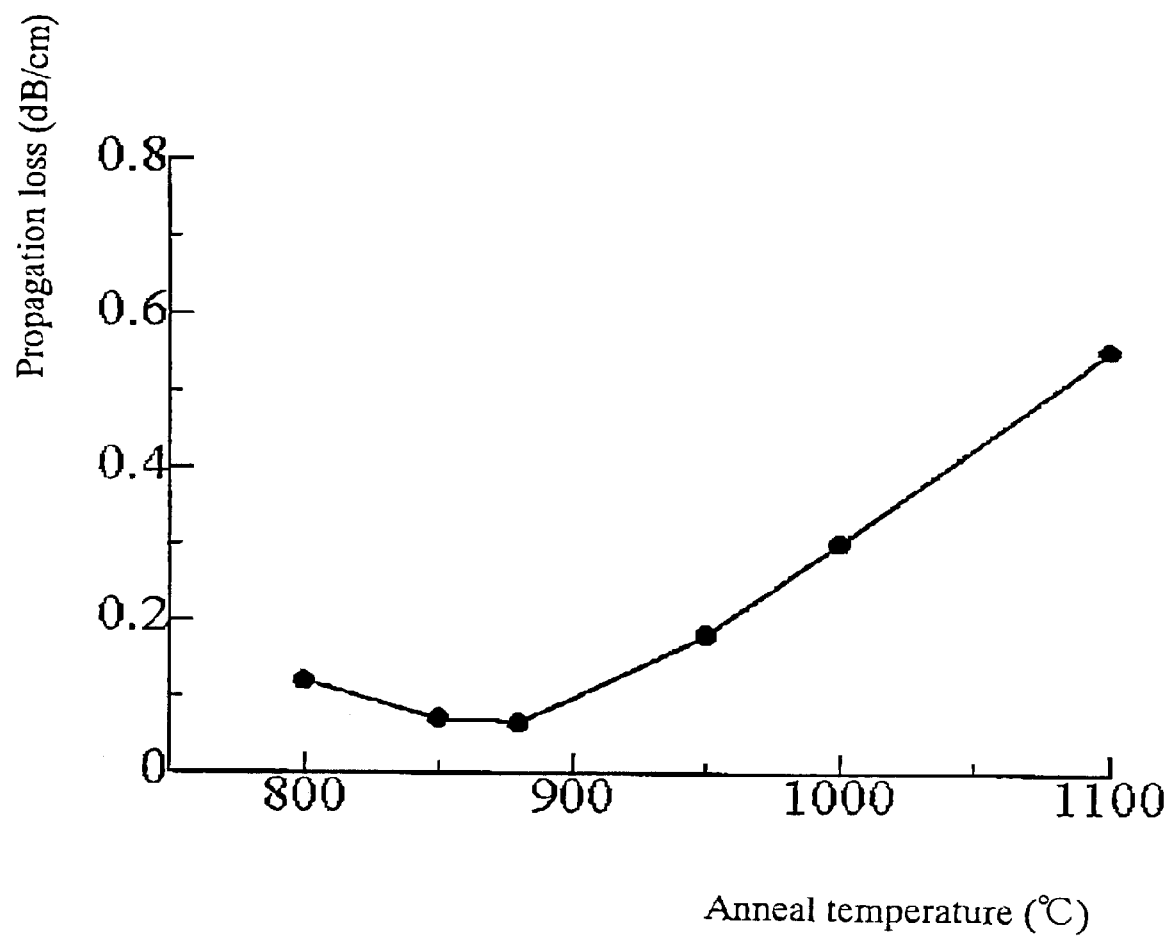
FIG. 6 is a diagram illustrative of variations in optical propagation loss of the cladding layer over anneal temperature, wherein the cladding layer comprises a silica-based layer highly doped with phosphorus at 4.0 percents by weight and boron at 6.0 percents by weight.

FIG. 6 is a diagram illustrative of variations in optical propagation loss of the cladding layer over anneal temperature, wherein the cladding layer comprises a silica-based layer highly doped with phosphorus at 4.0 percents by weight and boron at 6.0 percents by weight. The an atmospheric pressure chemical vapor deposition method, wherein silica-based layer was formed by an atmospheric pressure chemical vapor deposition method where an organic source of tetraethylolsosilicate ($Si(OC_2H_5)_4$) is decomposed with ozone ($O_3$). If the anneal temperature is not more than 1000° C., then the optical propagation loss is within 0.3 dB/cm. It was confirmed by a microscope that no deposition appears in the silica-based layer or on the surface of the silica-based layer, for which reason the maximum anneal temperature is 1000° C. If the anneal temperature is less than 800° C., then the top cladding layer is insufficiently softened for completely filling a narrow gap between the cores, for which reason the minimum anneal temperature is 800° C.

PREFERRED EMBODIMENT

First Embodiment

Figure 7A:
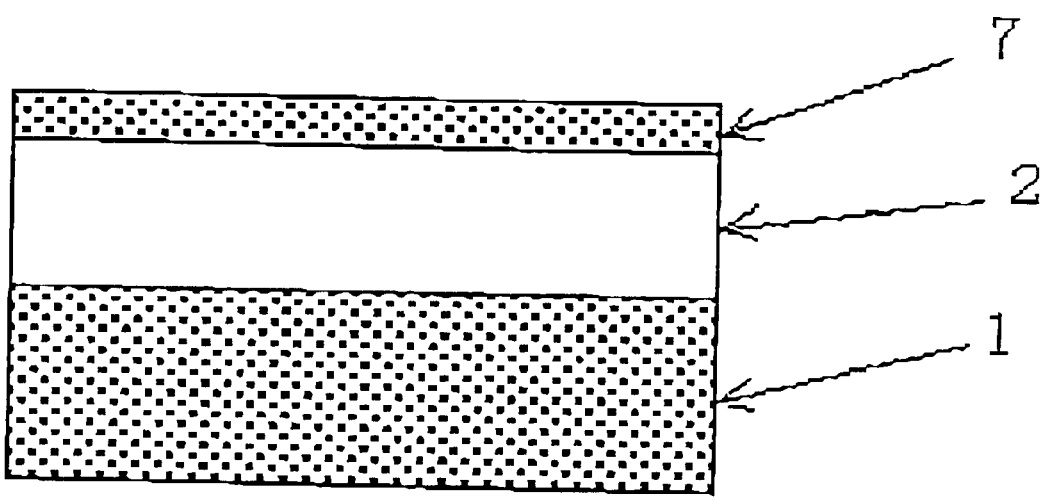
FIGS. 7A through 7C are fragmentary cross sectional elevation views illustrative of novel array waveguide grid devices in sequential steps involved in a novel fabrication method in a first embodiment in accordance with the present invention.
Figure 7B:
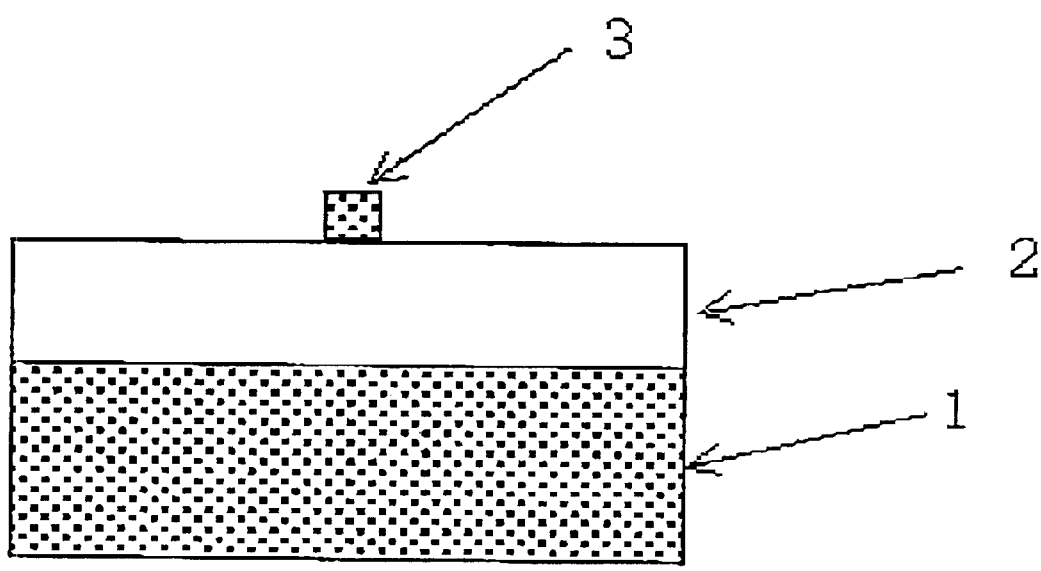
Figure 7C:
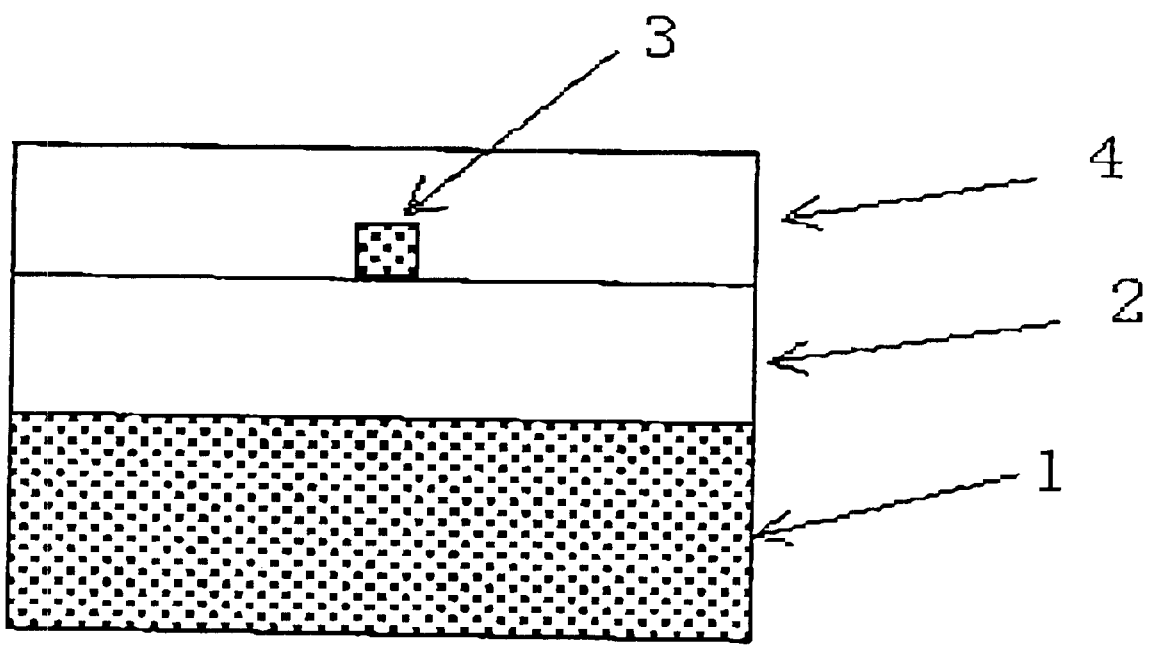

A first embodiment according to the present invention will be described in detail with reference to the drawings. FIGS. 7A through 7C are fragmentary cross sectional elevation views illustrative of novel array waveguide grid devices in sequential steps involved in a novel fabrication method in a first embodiment in accordance with the present invention.

With reference to FIG. 7A, a bottom cladding layer 2 was deposited on a silicon substrata at a growth temperature of 400° C. by an atmospheric pressure chemical vapor deposition method, wherein an organic source of tetraethylolsosilicate ($Si(OC_2H_5)_4$) is decomposed with ozone ($O_3$). The bottom cladding layer 2 comprises a boro-phospho-silicate glass layer (BPSG: $SiO_2+P_2O_5+B_2O_3$). The bottom cladding layer 2 has a thickness of 15 micrometers. A core layer 7 was further deposited on the bottom cladding layer 2 at a growth temperature of 400° C. by an atmospheric pressure chemical vapor deposition methods wherein an organic source of tetraethylolsosilicate ($Si(OC_2H_5)_4$) is decomposed with ozone ($O_3$). The Core layer 7 comprises a silica-based film doped with phosphorus and germanium (GPSG: $SiO_2+P_2O_5+GeO_2$). The core layer 7 has a thickness of 5.5 micrometers.

With reference to FIG. 7B, the core layer 7 was patterned by a photolithography process and a subsequent reactive ion etching process to form a channel type core 3 on the bottom cladding layer 2.

With reference to FIG. 7C, a top cladding layer 4 was deposited on the core layer 7 and over the bottom cladding layer 2 at a growth temperature of 400° C. by an atmospheric pressure chemical vapor deposition method, wherein an organic source of tetraethylolsosilicate ($Si(OC_2H_5)_4$) is decomposed with ozone ($O_3$). The top cladding layer 4 comprises a boro-phospho-silicate glass layer (BPSG: $SiO_2+P_2O_5+B_2O_3$). The top cladding layer 4 has a thickness of 15 micrometers. An anneal was carried out at a temperature of 880° C. for 3 hours. The germanium concentration of the core layer 7 was adjusted so that a difference in relative refractive index between the top and bottom cladding layers 2 and 4 and the core layer 7 is suppressed within 0.7 percents.

As a modification, it is possible that the core layer 7 may comprise a silica-based layer, doped with at last one dopant selected from the group consisting of phosphorus, germanium and boron, or an SiON layer or a SiN layer.

It is preferable for convenience to control the light that the top and bottom cladding layers 4 and 2 have the same refractive index.

The polarization dependency or the difference $\Delta\lambda$ in transmission center wavelength between the TM-mode and TE-mode as well as the phosphorus and boron concentrations of each of the top and bottom cladding layers were measured. The bottom cladding layer 2 has a phosphorus concentration of 5.1 percents by weight and a boron concentration of 75 percents by weight and a total dopant concentration of 12.6 percents by weight. The top cladding layer 4 also has the same phosphorus concentration of 5.1 percents by weight and the same boron concentration of 5.9 percents by weight and the same total dopant concentration of 12.6 percents by weight. The stress was 2.5E6 Pa. The transmission center wavelength difference $\Delta\lambda$ was 0.01 nanometer. The insertion loss was 2.3 dB.

Similar experiences to the above were carried out under the conditions of various total dopant concentrations in the range of 12–14 percents by weight. The measured transmission center wavelength differences $\Delta\lambda$ wore within 0.03 nanometers.

In accordance with the above first embodiment, the silica-based layers serving as the top and bottom cladding layers 4 and 2 and the core layer 7 were deposited at a low growth temperature of 400° C. by the atmospheric pressure chemical vapor deposition method, wherein an organic source of tetraethylolsosilicate ($Si(OC_2H_5)_4$) is decomposed with ozone ($O_3$). As a modification to the above, it is, however, possible to use other processes with a low temperature of not more than 1000° C., for example, a plasma enhanced chemical vapor deposition method or a low pressure chemical vapor deposition method.

Evaluation on reliability of the above novel optical waveguide device was made under high temperature and high humidity conditions. The above novel optical waveguide device was placed at a temperature of 85° C. and at a humidity of 90 percents for 1000 hours. No apparent change appeared on the optical waveguide device. A variation in optical propagation loss of the optical waveguide device was suppressed within 0.2 dB.

As described above, the polarization dependency or the difference $\Delta\lambda$ in transmission center wavelength between the TM-mode and TE-mode is proportional to the total dopant concentration of phosphorus and boron of the silica-based cladding layer. If the total dopant concentration of phosphorus and boron of the silica-based cladding layer is in the range of 8.8 percents by weight to 15 percents by weight, then the polarization dependency or the difference $\Delta\lambda$ in transmission center wavelength is not more than 0.03 nanometers. For the dopant concentrations of phosphorus and boron, the boron concentration is in the range of 3 percents by weight top 11 percents by weight whilst the phosphorus concentration is in the range of 4 percents by weight top 12 percents by weight. If the boron concentration is less than 3 percents by weight, then the softening, temperature is increased thereby making it difficult to exactly fill a narrow gap between the cores with the top cladding layer. For this reason, the minimum value of the boron concentration is 3 percents by weight. If the phosphorus concentration is less than 4 percents by weight and the total concentration of phosphorus and boron is not less than 9 percents by weight, then a moisture-stability or a moisture-proof property is remarkably deteriorated. For this reason, the minimum value of the phosphorus concentration is 4 percents by weight. If the total concentration of phosphorus and boron exceeds 15 percents by weight, then a moisture-stability or a moisture-proof property is remarkably deteriorated, and also the optical propagation loss is increased over time. For this reason, the maximum value of the total concentration of phosphorus and boron is 15 percents by weight.

In the above embodiment, the silica-based layers serving as the top and bottom cladding layers 4 and 2 and the core layer 7 were deposited by the atmospheric pressure chemical vapor deposition method, wherein an organic source of tetraethylolsosilicate ($Si(OC_2H_5)_4$) is decomposed with ozone ($O_3$). As a modification to the above, it is, however, possible to use other organic source, for example, alkoxide of silicon such as $Si(OCH_3)_4$, and $Si(OC_3H_7)_4$.

The silica-based layer is grown at a low temperature to suppress separated phases of $P_2O_5$ or $B_2O_3$ and also suppress deposition, even if the dopants such as P and B are doped at high concentrations, whereby the optical propagation loss is reduced. The top cladding layer or both the top and bottom cladding layers comprises a silica-based layer doped with at least one dopant selected from the group consisting of phosphorus and boron to form a boro-phospho-silicate ass layer, wherein the silica-based layer has a total dopant concentration in the range of 8.8 percents by weight by 15 percents by weight, whereby the top cladding layer or both the top and bottom cladding layers are made closer in thermal expansion coefficient to the silicon substrate. Namely, a difference in thermal expansion coefficient between either the top and bottom cladding layers or the top cladding layer and the silicon substrate is reduced. The reduction in thermal expansion coefficient between either the top and bottom cladding layers or the top cladding layer and the silicon substrate also reduces the stress generated in the silica-based optical wave guide layer. As a result, the optical wave guide device has a reduced polarization dependency and a reduced optical propagation loss. The optical wave guide device is suitable for the optical interferometer such as the array waveguide grid device.

Second Embodiment

Figure 8A:
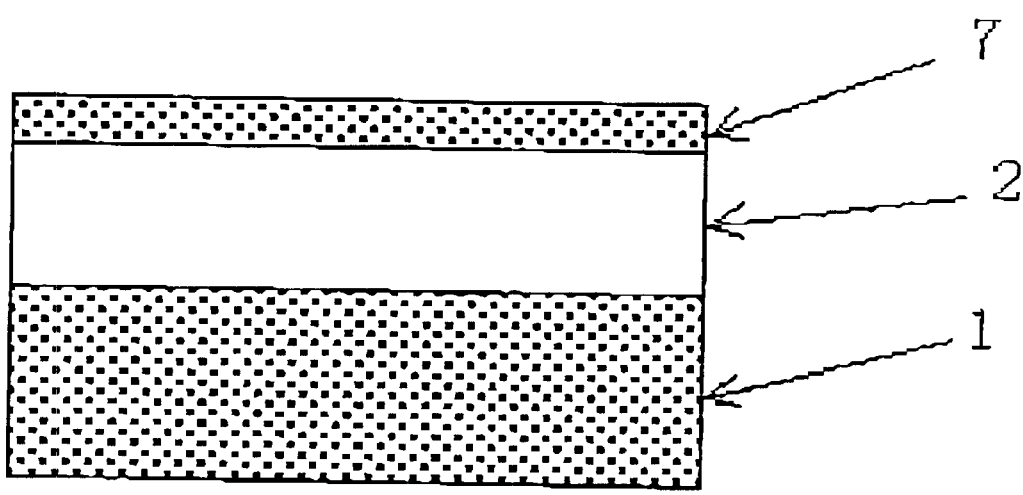
FIGS. 8A through 8C are fragmentary cross sectional elevation views illustrative off novel array waveguide grid devices in sequential steps involved in a novel fabrication method in a second embodiment in accordance with the present invention.
Figure 8B:
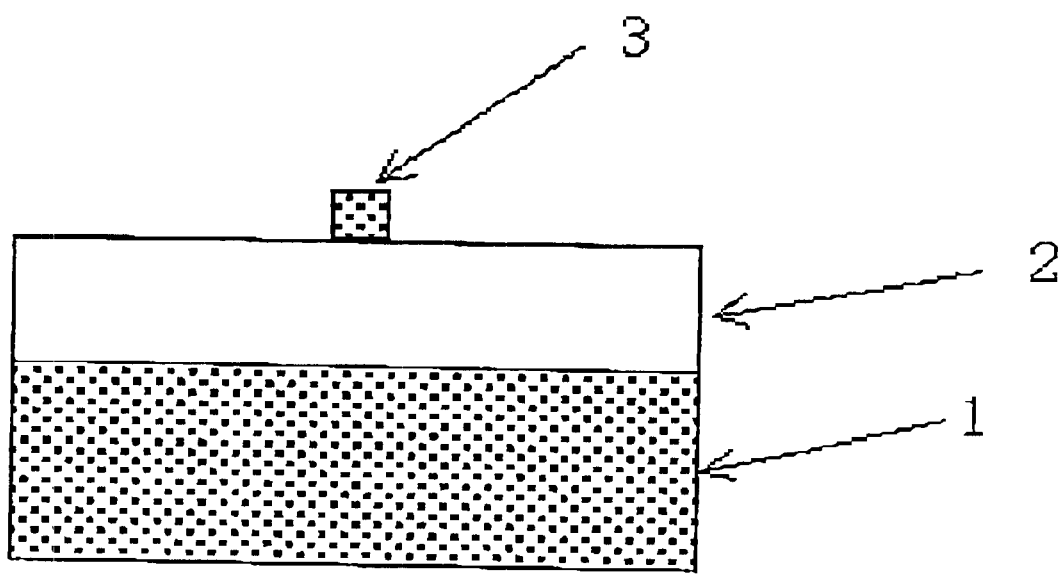
Figure 8C:
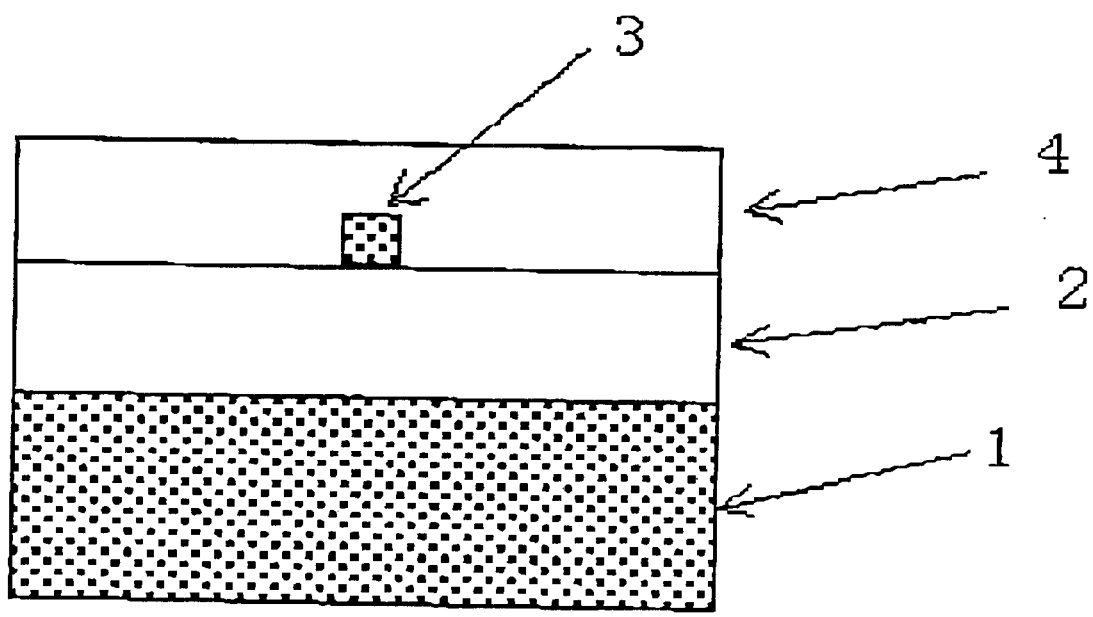

A second embodiment according to the present invention will be described in detail with reference to the drawings. FIGS. 8A through 8C are fragmentary cross sectional elevation views illustrative of novel array waveguide grid devices in sequential steps involved in a novel fabrication method in a second embodiment in accordance with the present invention.

With reference to FIG. 8A, a bottom cladding layer 2 was deposited on a silicon substrate at a growth temperature of 400° C. by an atmospheric pressure chemical vapor deposition method, wherein an organic source of tetraethylolsosilicate ($Si(OC_2H_5)_4$) is decomposed with ozone ($O_3$). The bottom cladding layer 2 comprises a boro-phospho-silicate glass layer (BPSG: $SiO_2+P_2O_5+B_2O_3$). The bottom cladding layer 2 has a thickness of 15 micrometers. A core layer 7 was further deposited on the bottom cladding layer 2 at a growth temperature of 400° C. by an atmospheric pressure chemical vapor deposition method, wherein an organic source of tetraethylolsosilicate ($Si(OC_2H_5)_4$) is decomposed with ozone ($O_3$). The cores layer 7 comprises a silica-based film doped with phosphorus and germanium (GPSG: $SiO_2+P_2O_5+GeO_2$). The core layer 7 has a thickness of 5.5 micrometers.

With reference to FIG. 8B, the core layer 7 was patterned by a photolithography process and a subsequent reactive ion etching process to form a channel type core 3 on the bottom cladding layer 2.

With reference to FIG. 8C, a top cladding layer 4 was deposited on the core layer 7 and over the bottom cladding layer 2 at a growth temperature of 400° C. by an atmospheric pressure chemical vapor deposition method, wherein an organic source of tetraethylolsosilicate ($Si(OC_2H_5)_4$) is decomposed with ozone ($O_3$). The top cladding layer 4 comprises a boro-phospho-silicate glass layer (BPSG: $SiO_2+P_2O_5+B_{203}$). The top cladding, layer 4 has a thickness of 15 micrometers. An anneal was carried out at a temperature of 880° C. for 3 hours. The germanium concentration of the core layer 7 was adjusted so that a difference in relative refractive index between the top and bottom cladding layers 2 and 4 and the core layer 7 is suppressed within 0.7 percents.

As a modification, it is possible that the core layer 7 may comprise a silica-based layer doped with at least one dopant selected from the group consisting of phosphorus, germanium and boron, or an SiON layer or a SiN layer.

It is preferable for convenience to control the light that the top and bottom cladding layers 4 and 2 have the same refractive index.

The polarization dependency or the difference $\Delta\lambda$ in transmission center wavelength between the TM-mode and TE-mode as well as the phosphorus and boron concentrations of each of the top and, bottom cladding layers were measured. The bottom cladding layer 2 has a phosphorus concentration of 4.1 percents by weight and a boron concentration of 5.9 percents by weight and a total dopant concentration of 10.0 percents by weight. The top cladding layer 4 has a phosphorus concentration of 5.5 percents by weight and a boron concentration of 8.0 percents by weight and a total dopant concentration of 13.5 percents by weight. The stress was 3E6 Pa. The transmission center wavelength difference $\Delta\lambda$ was 0.015 nanometer. The insertion loss was 1.9 dB. In this embodiment, the bottom cladding layer 2 is lower in total dopant concentration than the top cladding layer 4, so that the bottom cladding layer 2 is higher in softening temperature than the top cladding layer 4 so as to prevent the core 3 from being submerged into the bottom cladding layer 2 or from tiling. Since the total stress of the waveguide is increased, it is necessary to increase the total dopant concentration as compared to the first embodiment.

Similar experiences to the above were carried out under the conditions of various total dopant concentrations in the range of 12–14 percents by weight. The measured transmission center wavelength differences $\Delta\lambda$ were within 0.03 nanometers.

In accordance with the above second embodiment, the silica-based layers serving as the top and bottom cladding layers 4 and 2 and the core layer 7 were deposited at a low growth temperature of 400° C. by the atmospheric pressure chemical vapor deposition method, wherein an organic source of tetraethylolsosilicate ($Si(OC_2H_5)_4$) is decomposed with ozone ($O_3$). As a modification to the above, it is, however, possible to use other processes with a low temperature of not more than 1000° C., for example, a plasma enhanced chemical vapor deposition method or a low pressure chemical vapor deposition method.

Evaluation on reliability of the above novel optical waveguide device was made under high temperature and high humidity conditions. The above novel optical waveguide device was placed at a temperature of 85° C. and at a humidity of 90 percents for 1000 hours. No apparent change appeared on the optical waveguide device. A variation in optical propagation loss of the optical waveguide device was suppressed within 0.2 dB.

As described above, the polarization dependency or the difference $\Delta\lambda$ in transmission center wavelength between the TM-mode and TE-mode is proportional to the total dopant concentration of phosphorus and boron of the silica-based cladding layer. If the total dopant concentration of phosphorus and boron of the silica-based cladding layer is in the range of 8.8 percents by weight to 15 percents by weight, then the polarization dependency or the difference $\Delta\lambda$ in transmission center wavelength is not more than 0.03 nanometers. For the dopant concentrations of phosphorus and boron, the boron concentration is in the range of 3 percents by weight top 11 percents by weight whilst the phosphorus concentration is in the range of 4 percents by weight top 12 percents by weight. If the boron concentration is less than 3 percents by weight, then the softening temperature is increased thereby making it difficult to exactly fill a narrow gap between the cores with the top cladding layer. For this reason, the minimum value of the boron concentration is 3 percents by weight. If the phosphorus concentration is less than 4 percents by weight and the total concentration of phosphorus and boron is not less than 9 percents by weight, then a moisture-stability or a moisture-proof property is remarkably deteriorated. For this reason, the minimum value of the phosphorus concentration is 4 percents by weight. If the total concentration of phosphorus and boron exceeds 15 percents by weight, then a moisture-stability or a moisture-proof property is remarkably deteriorated, and also the optical propagation loss is increased over time. For this reason, the maximum value of the total concentration of phosphorus and boron is 15 percents by weight.

In the above embodiment, the silica-based layers serving as the top and bottom cladding layers 4 and 2 and the core layer 7 were deposited by the atmospheric pressure chemical vapor deposition method, wherein an organic source of tetraethylolsosilicate $(Si(OC_2H_5)_4)$ is decomposed with ozone $(O_3)$. As a modification to the above, it is, however, possible to use other organic source, for example, alkoxide of silicon such as $Si(OCH_3)_4$, and $Si(OC_3H_7)_4$.

The silica-based layer is grown at a low temperature to suppress separated phases of $P_2O_5$ or $B_2O_3$ and also suppress deposition, even if the dopants such as P and B are doped at high concentrations, whereby the optical propagation loss is reduced. The top cladding layer or both the top and bottom cladding layers comprises a silica-based layer doped with at least one dopant selected from the group consisting of phosphorus and boron to form a boro-phospho silicate glass layer, wherein the silica-based layer has a total dopant concentration in the range of 8.8 percents by weight by 15 percents by weight, whereby the top cladding layer or both the top and bottom cladding layers are made closer in thermal expansion coefficient to the silicon substrate. Namely, a difference in thermal expansion coefficient between either the top and bottom cladding layers or the top cladding layer and the silicon substrate is reduced. The reduction in thermal expansion coefficient between either the top and bottom cladding layers or the top cladding layer and the silicon substrate also reduces the stress generated in the silica-based optical wave guide layer. As a result, the optical wave guide device has a reduced polarization dependency and a reduced optical propagation loss. The optical wave guide device is suitable for the optical interferometer such as the array waveguide grid device.

Figure 9A:
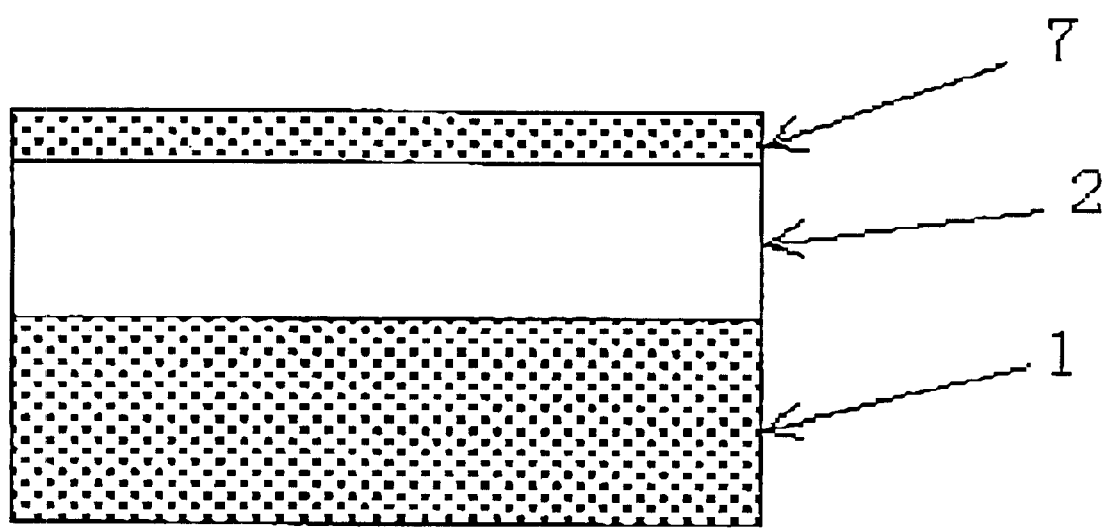
FIGS. 9A through 9C are fragmentary cross sectional elevation views illustrative of novel array waveguide grid devices in sequential steps involved in a novel fabrication method in a third embodiment in accordance with the present invention.
Figure 9B:
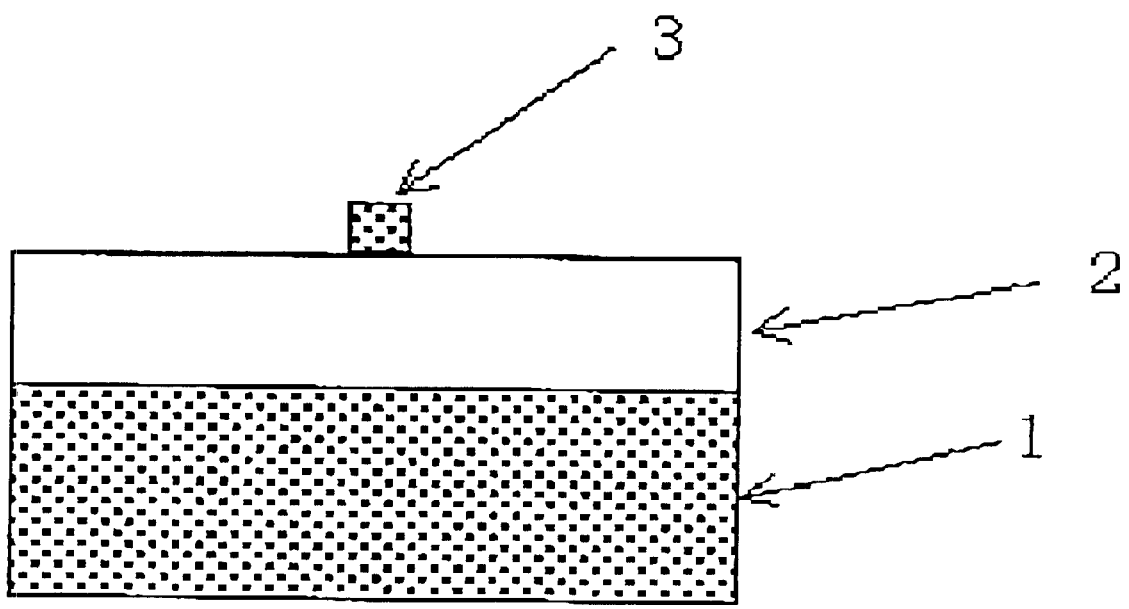
Figure 9C:
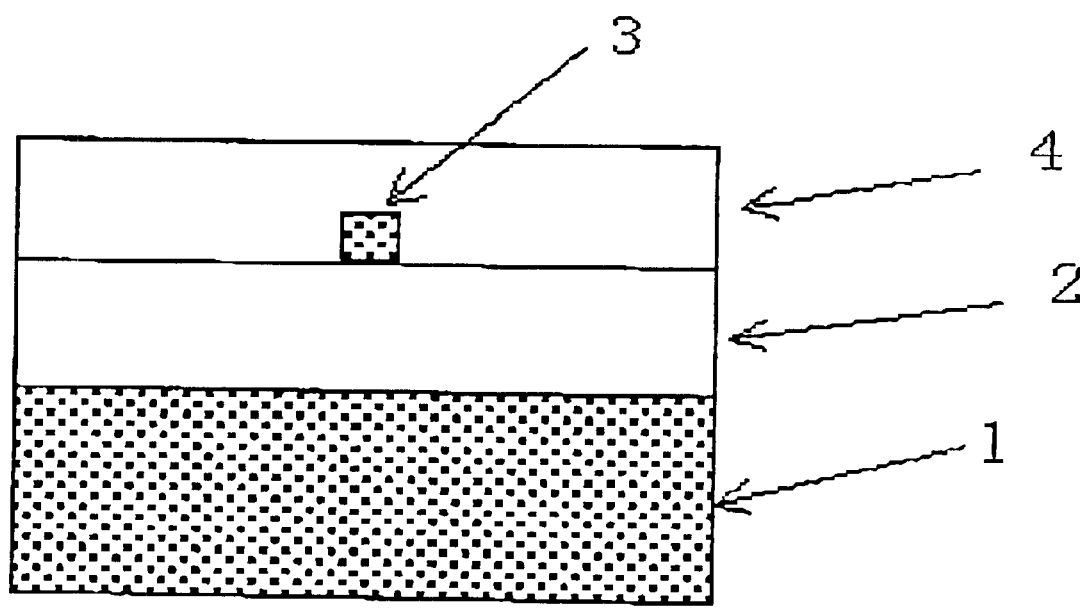

Third Embodiment:

A third embodiment according to the present invention will be described in detail with reference to the drawings. FIGS. 9A through 9C are fragmentary cross sectional elevation views illustrative of novel array waveguide grid devices in sequential steps involved in a novel fabrication method in a third embodiment in accordance with the present invention.

With reference to FIG. 9A, a bottom cladding layer 2 was deposited on a silicon substrate at a growth temperature of 400° C. by an atmospheric pressure chemical vapor deposition method, wherein an organic source of tetraethylolsosilicate $(Si(OC_2H_5)_4)$ is decomposed with ozone $(O_3)$. The bottom cladding layer 2 comprises a phospho-silicate glass layer (PSG: $SiO_2+P_2O_5+B_2O_3$). The bottom cladding layer 2 has a thickness of 15 micrometers. A core layer 7 was further deposited on the bottom cladding layer 2 at a growth temperature of 400° C. by an atmospheric pressure chemical vapor deposition method, wherein an organic source of tetraethylolsosilicate $(Si(OC_2H_5)_4)$ is decomposed with ozone $(O_3)$. The core layer 7 comprises a silica-based film doped with phosphorus and germanium (GPSG: $SiO_2+P_2O_5+GeO_2$). The core layer 7 has a thickness of 5.5 micrometers.

With reference to FIG. 9B, the core layer 7 was patterned by a photolithography process and a subsequent reactive ion etching process to form a channel type core 3 on the bottom cladding layer 2.

With reference to FIG. 9C, a top cladding layer 4 was deposited on the core layer 7 and over the bottom cladding layer 2 at a growth temperature of 400° C. by an atmospheric pressure chemical vapor deposition method, wherein an organic source of tetraethylolsosilicate $(Si(OC_2H_5)_4)$ is decomposed with ozone $(O_3)$. The top cladding layer 4 comprises a boro-phospho-silicate glass layer (BPSG: $SiO_2+P_2O_5+B_2O_3$). The top cladding layer 4 has a thickness of 15 micrometers. An anneal was carried out at a temperature of 880° C. for 3 hours. The germanium concentration of the core layer 7 was adjusted so that a difference in relative refractive index between the top and bottom cladding layers 2 and 4 and the core layer 7 is suppressed within 0.7 percents.

As a modification, it is possible that the core layer 7 may comprise a silica-based layer doped with at least one dopant selected from the group consisting of phosphorus, germanium and boron, or an SiON layer or a SiN layer.

It is preferable for convenience to control the light that the top and bottom cladding layers 4 and 2 have the same refractive index.

The polarization dependency or the difference $\Delta\lambda$ in transmission center wavelength between the TM-mode and TE-mode as well as the phosphorus and boron concentrations of each of the top and bottom cladding layers were measured. The bottom cladding layer 2 has a phosphorus concentration of 9.2 percents by weight. The top cladding layer 4 has a phosphorus concentration of 5.6 percents by weight and a boron concentration of 8.4 percents by weight and a total dopant concentration of 14.0 percents by weight. The stress was 3.6E6 Pa. The transmission center wavelength difference $\Delta\lambda$ was 0.02 nanometer. The insertion loss was 2.5 dB. In this embodiment, the bottom cladding layer 2 composed the silica-based layer doped with only phosphorus to further increase the softening temperature, so that the bottom cladding layer 2 is higher in softening temperature than the top cladding layer 4 so as to prevent the core 3 from being submerged into the bottom cladding layer 2 or from tiling.

As a modification, the bottom cladding layer 2 may comprise a silica-based layer doped with germanium and phosphorus or a germa-phospho-silicate glass layer.

Similar experiences to the above were carried out under the conditions of various total dopant concentrations in the range of 12–14 percents by weight. The measured transmission center wavelength differences $\Delta\lambda$ were within 0.03 nanometers.

In accordance with the above third embodiment, the silica-based layers serving as the top and bottom cladding layers 4 and 2 and the core layer 7 were deposited at a low growth temperature of 400° C. by the atmospheric pressure chemical vapor deposition method, wherein an organic source of tetraethylolsosilicate $(Si(OC_2H_5)_4)$ is decomposed with ozone $(O_3)$. As a modification to the above, it is, however, possible to use other processes with a low temperature of not more than 1000° C., for example, a plasma enhanced chemical vapor deposition method or a low pressure chemical vapor deposition method.

Evaluation on reliability of the above novel optical waveguide device was made under high temperature and high humidity conditions. The above novel optical waveguide device was placed at a temperature of 85° C. and at a humidity of 90 percents for 1000 hours. No apparent change appeared on the optical waveguide device. A variation in optical propagation loss of the optical waveguide device was suppressed within 0.2 dB.

As described above, the polarization dependency or the difference $\Delta\lambda$ in transmission center wavelength between the TM-mode and TE-mode is proportional to the total dopant concentration of phosphorus and boron of the silica-based cladding layer. If the total dopant concentration of phosphorus and boron of the silica-based cladding layer is in the range of 8.8 percents by weight to 15 percents by weight, then the polarization dependency or the difference $\Delta\lambda$ in transmission center wavelength is not more than 0.03 nanometers. For the dopant concentrations of phosphorus and boron, the boron concentration is in the range of 3 percents by weight top 11 percents by weight whilst the phosphorus concentration is in the range of 4 percents by weight top 12 percents by weight. If the boron concentration is less than 3 percents by weight, then the softening temperature is increased thereby making it difficult to exactly fill a narrow gap between the cores with the top cladding layer. For this reason, the minimum value of the boron concentration is 3 percents by weight. If the phosphorus concentration is less than 4 percents by weight and the total concentration of phosphorus and boron is not less than 9 percents by weight, then a moisture-stability or a moisture-proof property is remarkably deteriorated. For this reason, the minimum value of the phosphorus concentration is 4 percents by weight. If the total concentration of phosphorus and boron exceeds 15 percents by weight, then a moisture-stability or a moisture-proof property is remarkably deteriorated, and also the optical propagation loss is increased over time. For this reason, the maximum value of the total concentration of phosphorus and boron is 15 percents by weight.

In the above embodiment, the silica-based layers serving as the top and bottom cladding layers 4 and 2 and the core layer 7 were deposited by the atmospheric pressure chemical vapor deposition method, wherein an organic source of tetraethylolsosilicate ($Si(OC_2H_5)_4$) is decomposed with ozone ($O_3$). As a modification to the above, it is, however, possible to use other organic source, for example, alkoxide of silicon such as $Si(OCH_3)_4$, and $Si(OC_3H_7)_4$.

The silica-based layer is grown at a low temperature to suppress separated phases Of $P_2O_5$ or $B_2O_3$ and also suppress deposition, oven if the dopants such as P and B are doped at high concentrations, whereby the optical propagation loss is reduced. The top cladding layer or both the top and bottom cladding layers comprises a silica-based layer doped with at least one dopant selected from the group consisting of phosphorus and boron to form a boro-phospho-silicate glass layer, wherein the silica-based layer has a total dopant concentration in the range of 8.8 percents by weight by 15 percents by weight, whereby the top cladding layer or both the top and bottom cladding layers are made closer in thermal expansion coefficient to the silicon substrate. Namely, a difference in thermal expansion coefficient between either the top and bottom cladding layers or the top cladding layer and the silicon substrate is reduced. The reduction in thermal expansion coefficient between either the top and bottom cladding layers or the top cladding layer and the silicon substrate also reduces the stress generated in the silica-based optical wave guide layer. As a result, the optical wave guide device has a reduced polarization dependency and a reduced optical propagation loss. The optical wave guide device is suitable for the optical interferometer such as the array waveguide grid device.

Figure 10A:
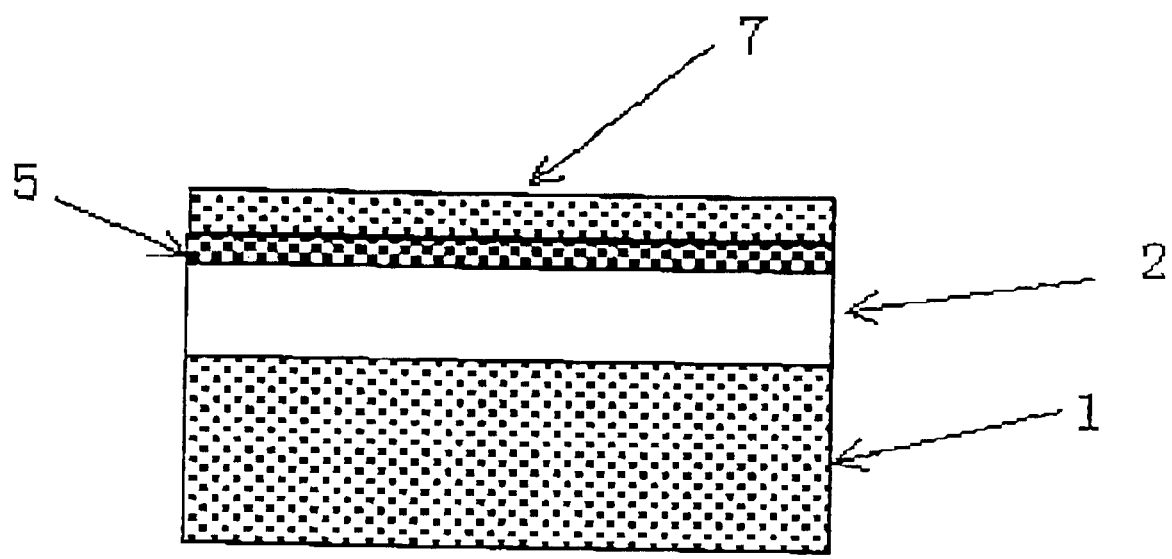
FIGS. 10A through 10C are fragmentary cross sectional elevation views illustrative of novel array waveguide grid devices in sequential steps involved in a novel fabrication method in a fourth embodiment in accordance with than present invention.
Figure 10B:
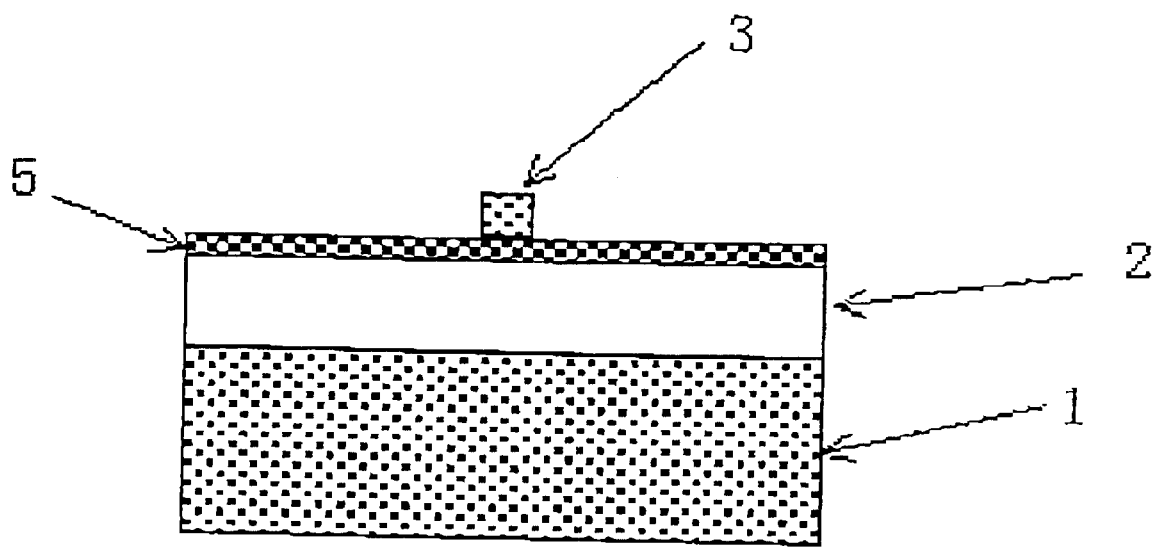
Figure 10C:
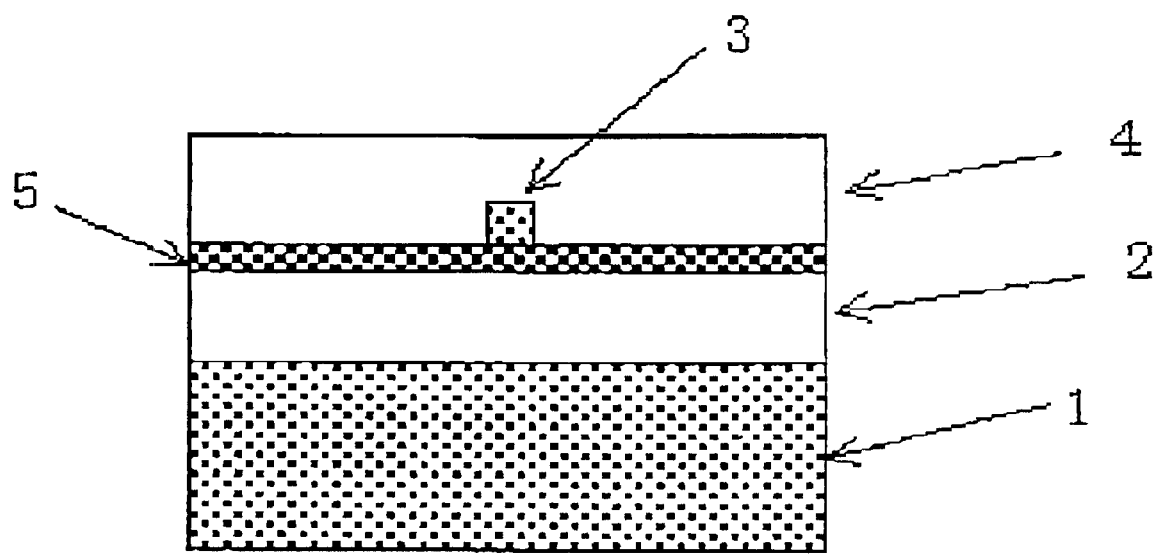

Fourth Embodiment:

A fourth embodiment according to the present invention will be described in detail with reference to the drawings. FIGS. 10A through 10C are fragmentary cross sectional elevation views illustrative of novel array waveguide grid devices in sequential steps involved in a novel fabrication method in a fourth embodiment in accordance with the present invention.

With reference to FIG. 10A, a bottom cladding layer 2 was deposited on a silicon substrate by an atmospheric pressure chemical vapor deposition methods, wherein an organic source of tetraethylolsosilicate ($Si(OC_2H_5)_4$) is decomposed with ozone ($O_3$). The bottom cladding layer 2 comprises a boro-phospho-silicate glass layer (BPSG: $SiO_2+P_2O_5+B_2O_3$). A first submerge-preventing layer 5 was then deposited on the bottom cladding layer 2, wherein the first submerge-preventing layer 5 comprises a silica-based layer doped with phosphorus, for example, a phospho-silicate glass layer (PSG: $SiO_2+P_2O_5$). A core layer 7 was further the first submerge-preventing layer 5, wherein the core layer 7 comprise s a silica-based layer doped with phosphorus and germanium, for example, a germa-phospho-silicate glass layer (GPSG: $SiO_2+P_2O_5+GeO_2$).

With reference to FIG. 10B, the core layer 7 was patterned by a photolithography process and a subsequent reactive ion etching process to form a channel type core 3 on the first submerge-preventing layer 5.

With reference to FIG. 10C, a top cladding layer 4 was deposited on the core layer 7 and over the first submerge-preventing layer 5 by an atmospheric pressure chemical vapor deposition method, wherein an organic source of tetraethylolsosilicate ($Si(OC_2H_5)_4$) is decomposed with ozone ($O_3$). The top cladding layer 4 comprises a boro-phospho-silicate glass layer (BPSG: $SiO_2+P_2O_5+B_2O_3$). An anneal was carried out. The germanium concentration of the core layer 7 was adjusted so that a difference in relative refractive index between the top and bottom cladding layers 2 and 4 and the core layer 7 is suppressed within 0.7 percents.

It is preferable for convenience to control the light that the top and bottom cladding layers 4 and 2 have the same refractive index.

Figure 11:
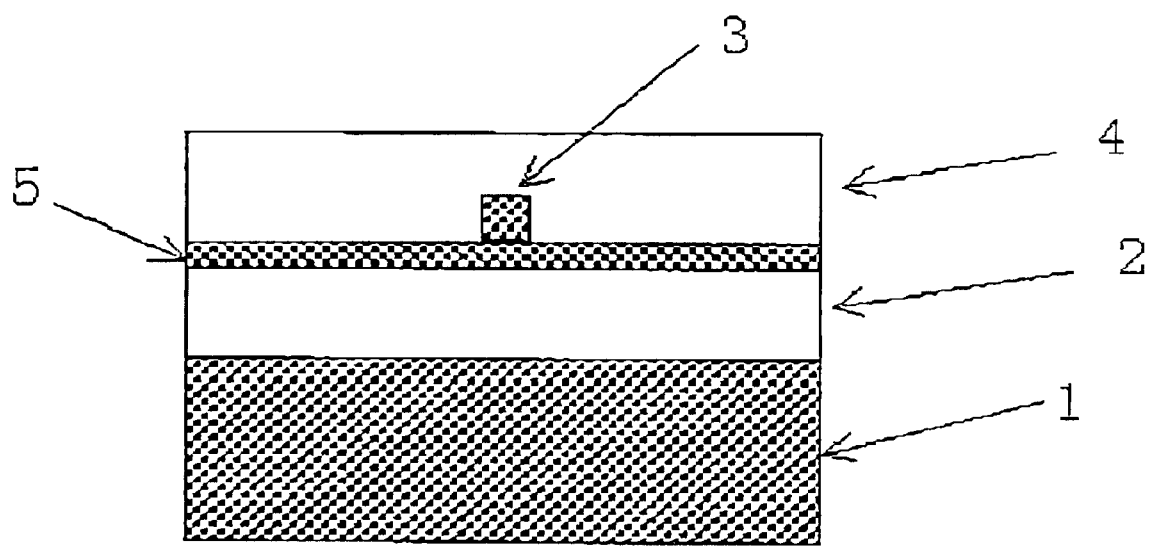
FIG. 11 is a fragmentary cross sectional elevation view illustrative of a novel array waveguide grid device in the fourth embodiment in accordance with the present invention.

FIG. 11 is a fragmentary cross sectional elevation view illustrative of a novel array waveguide grid device in the fourth embodiment in accordance with the present invention. The first submerge-preventing layer 5 prevents the core 3 from being submerged into the bottom cladding layer 2 or from tilting during the anneal. If the reactive ion etching penetrates the first submerge-preventing layer 5 and reaches the bottom cladding layer 2, then the above effect of the first submerge-preventing layer 5 could not be obtained. For this reason, it is difficult that the first submerge-preventing layer 5 is extremely thin. By contrast, if the first submerge-preventing layer 5 is extremely thick, the stress is increased by the first submerge-preventing layer 5. For this reason, it is preferable that the thickness of the first submerge-preventing layer 5 is in the range of 0.2 micrometers to 5 micrometers in consideration of in-plane variation of the reactive ion etching. The first reason why the phospho-silicate glass is used for the first submerge-preventing layer 5 is that the phospho-silicate glass is higher in softening temperature than the boro-phospho-silicate glass, whereby the first submerge-preventing layer 5 of phospho-silicate glass prevents the submerge of the core 3 during the anneal at a temperature of not more than 900° C. The second reason why the phospho-silicate glass is used for the first submerge-preventing layer 5 is that it is possible to control the refractive index of the first submerge-preventing layer 5 by controlling the phosphorus concentration so that the refractive index of the first submerge-preventing layer 5 is made closer to the refractive index of the bottom and top cladding layers 2 and 4. The third reason why the phospho-silicate glass is used for the first submerge-preventing layer 5 is that it is possible to reduce the stress by doping phosphorus into the silica-based layer.

As a modification, it is, however, possible that the first submerge-preventing layer 5 may comprise a silica-based layer doped with other dopants such as P, B, Ge and F.

Figure 12:
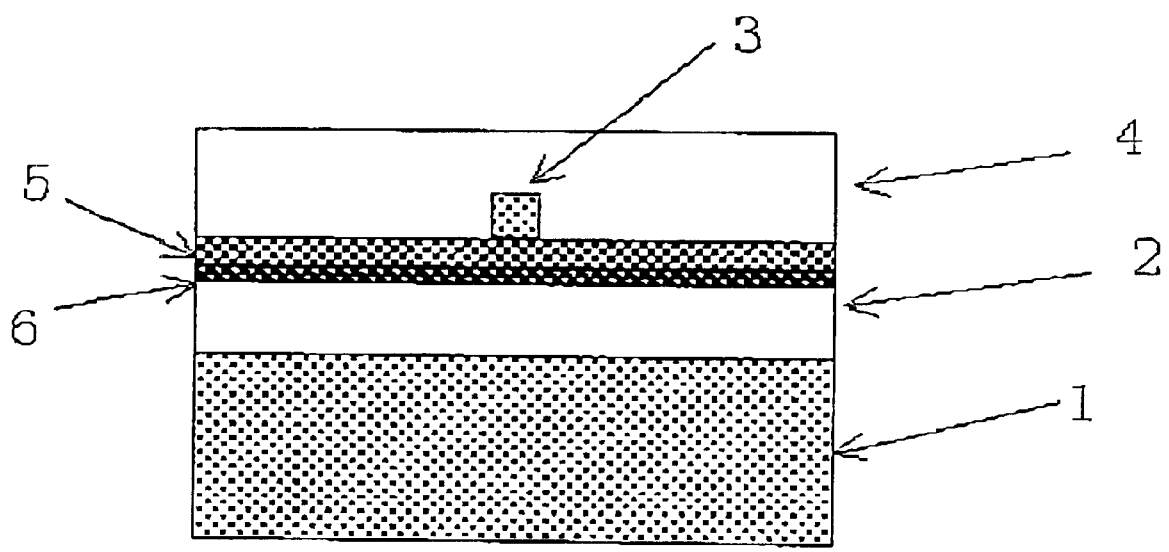
FIG. 12 is a fragmentary cross sectional elevation view illustrative of a novel modified array waveguide grid device as a modification to the fourth embodiment in accordance with the present invention.

FIG. 12 is a fragmentary cross sectional elevation view illustrative of a novel modified array waveguide grid device as a modification to the fourth embodiment in accordance with the present invention. A difference of the novel modified array waveguide grid device of FIG. 12 from the novel array waveguide grid device of FIG. 11 is only that a second submerge-preventing layer 6 is further formed over the bottom cladding layer 2 and under the first submerge-preventing layer 5. The second submerge-preventing layer 6 is higher in softening temperature than the first submerge-preventing layer 5 in order to obtain an increased effect of preventing the core 3 from being submerged into the bottom cladding layer 2 or from tilting during the anneal. It is possible that the first submerge-preventing layer 5 may comprise a silica-based layer doped with phosphorus, for example, a phospho-silicate glass layer whilst the second submerge-preventing layer 6 may comprise an undoped silica-based layer, for example, a natural silicate glass layer. The natural silicate glass layer is higher in softening temperature than the boro-phospho-silicate glass layer of the bottom and top cladding layers 2 and 4. The second submerge-preventing layer 6 comprising the natural silicate glass layer exhibits the increased effect of preventing the core 3 from being submerged into the bottom cladding layer 2 or from tilting during the anneal. The second submerge-preventing layer 6 comprising the natural silicate glass layer, however, has a large stress and makes it difficult to control the refractive index. For those reasons, it is preferable that the second submerge-preventing layer 6 has a sufficient thickness for preventing the core 3 from being submerged into the bottom cladding layer 2 or from tilting during the anneal, but the second submerge-preventing layer 6 is thin so as avoiding the increase in the stress and variation in equivalent refractive index. The preferable thickness of the second submerge-preventing layer 6 comprising the natural silicate glass layer is in the range of 0.1 micrometer to 0.3 micrometers, so that the stress and the equivalent refractive index are almost the same is when the second submerge-preventing layer 6 is not formed. The laminations of the first and second submerge-preventing layers 5 and 6 prevents the submerge of the core 3 during the anneal at a temperature of not more than 1000° C. If the first submerge-preventing layer 5 is not provided and the second submerge-preventing layer 6 only is provided, then the reactive ion etching may penetrate the thin second submerge-preventing layer 6 and reach the bottom cladding layer 2. For this reason, it is important that the laminations of the first and second submerge-preventing layers 5 and 6 are formed in order to prevent the reactive ion etchings from reaching the bottom cladding layer 2. The first submerge-preventing layer 5 is adjacent to the core 3. The first submerge-preventing layer 5 may comprise a silica-based layer doped with phosphorus to reduce the stress, for example, the phospho-silicate glass layer. It is possible to make the refractive index of the first submerge-preventing layer 5 close to the refractive index of the top cladding layer comprising the boro-phospho-silicate glass layer. The laminations of the first and second submerge-preventing layers 5 and 6 adjust the stress and the refractive index. The laminations of the first and second submerge-preventing layers 5 and 6 prevent the core 3 from being submerged into the bottom cladding layer 2 or from tilting during the anneal and also prevent the reactive ion etching from penetrating the laminations of the first and second submerge-preventing layers 5 and 6 and reaching the bottom cladding layer 2. As a modification, it is possible that the first submerge-preventing layer 5 may comprise a silica-based layer doped with P, B, Ge and F, whilst the second submerge-preventing layer 6 may comprise an SiN layer or an SiON layer.

A single silica-based layer doped with phosphorus and boron was deposited on a silicon substrate by an atmospheric pressure chemical vapor deposition method, wherein an organic source of tetraethylolsosilicate ($Si(OC_2H_5)_4$) is decomposed with ozone ($O_3$). The silica-based layer comprises a boro-phospho-silicate glass layer (BPSG: $SiO_2$+$P_2O_5$+$B_2O_3$). The silica-based layer has a thickness of 15 micrometers. An anneal was carried out under various conditions "A", "B", "C", "D", and "E" as shown in the above Table 1.

As described above, FIG. 4 is illustrative of variations in film-stress of the above silica-based film over a total dopant concentration of phosphorus and boron when the anneal is carried out to the silica-based film under each of the above various conditions shown on Table 1, wherein the pulse or positive represents a tension whilst the minus or negative represents a compression. The stress of the layer was measured by measuring an amount of bending the substrate.

The stress is proportional to the total dopant concentration of phosphorus and boron under each of the various conditions. This means that it is possible to control the stress of the silica-based layer by controlling the total dopant concentration of phosphorus and boron. The stress generated in the silica-based layer depends upon the various conditions or process parameters, for example, the growth temperature, the anneal temperature and the anneal time. In accordance with the various process parameter, a total dopant concentration may be decided.

It is necessary for the array waveguide grid device that the polarization dependency loss is suppressed within 0.3 dB. The polarization dependency loss is approximately proportional to the difference $\Delta\lambda$ in transmission center wavelength between the TM-mode and TE-mode, wherein a proportional constant is in the range of a few dB/nm to 10 db/nm. It is necessary that the absolute value of the difference $\Delta\lambda$ in transmission center wavelength between the TM-mode and TE-mode is suppressed within 0.03 nanometers. Since $\Delta\lambda=\Delta L/m\times B$, then $\Delta L/m\times B \leq 0.03$ nanometers, where $\Delta L$ is the difference in optical path, m is the order of diffraction and B is the birefringence or double refraction or a difference in equivalent refraction between the TE-mode and the TM-mode. If $\Delta L=60.73$ micrometers, and m=57, then since B−Kσ, where it is necessary that $\sigma \leq 8.3E6$ Pa, where σ is the film stress and K is the optical elastic constant, and K−3.4E−12/Pa. In order to optimize the difference $\Delta\lambda$ in transmission center wavelength between the TM-mode and TE-mode, not only the film stress of the single layer but also heat history and layered structure of the device should be considered.

As described above, FIG. 5 is illustrative of variations in the difference $\Delta\lambda$ in transmission center wavelength between the TM-mode and TE-mode of the above silica-based film over a total dopant concentration of phosphorus and boron when the anneal is carried out to the silica-based film under each of the above various conditions shown on Table 1. The difference $\Delta\lambda$ in transmission center wavelength between the TM-mode and TE-mode of the above silica-based film is proportional to the total dopant concentration of phosphorus and boron under each of the individual conditions. If the difference $\Delta\lambda$ in transmission center wavelength between the TM-mode and TE-mode is almost zero, then this means that the optical waveguide device is almost independent from the polarization. The control of the total dopant concentration of phosphorus and boron makes it possible to form or obtain the optical waveguide device which is almost independent from the polarization. If the growth temperature is in the range of 386–450° C., and the anneal temperature is in the range of 800–1000° C., then the total dopant concentration of phosphorus and boron is controlled in the range of 8.8 percents by weight to 15 percents by weight so as to suppress the transmission center wavelength difference $\Delta\lambda$ within 0.03 nanometers, whereby the optical wave guide device is almost independent from the polarization.

If the optical wave guide device is free of any optical interferometer, then it is necessary to suppress the film stress within 3E7 Pa. In order to suppress the film stress within 3E7 Pa, it is necessary that the total dopant concentration of phosphorus and boron is controlled in the range of 6.2 percents, by weight to 17.6 percents by weight.

As described above, the film stress depends upon the total dopant concentration of phosphorus and boron but does not depend upon a ratio in dopant concentration of phosphorus to boron. Also, the difference $\Delta\lambda$ in transmission center wavelength between the TM-mode and TB-mode of the above silica-based film depends upon the total dopant concentration of phosphorus and boron but does not depend upon a ratio in dopant concentration of phosphorus to boron.

The maximum anneal temperature was set at 1000° C. to prevent the optical transmission loss. The silica-based layer is heavily doped with phosphorus and boron at high dopant concentrations so that the thermal expansion coefficient of the silica-based layer is made close to the thermal expansion coefficient of the silicon substrate. If, contrary to the present invention, the separated phases and the segregation are caused which increase the optical propagation loss.

As described above, FIG. 6 is illustrative of variations in optical propagation loss of the cladding layer over anneal temperature, wherein the cladding layer comprises a silica-based layer highly doped with phosphorus at 4.0 percents by weight and boron at 6.0 percents by weight. The an atmospheric pressure chemical vapor deposition method, wherein silica-based layer was formed by an atmospheric pressure chemical vapor deposition method were an organic source of tetraethylolsosilicate ($Si(OC_2H_5)_4$) is decomposed with ozone ($O_3$). If the anneal temperature is not more than 1000° C., then the optical propagation loss is within 0.3 dB/cm. It was confirmed by a microscope that no deposition appears in the silica-based layer or on the surface of the silica-based layer, for which reason the maximum anneal temperature is 1000° C. If the anneal temperature is less than 800° C., then the top cladding layer is insufficiently softened for completely filling a narrow gap between the cores, for which reason the minimum anneal temperature is 800° C.

An array waveguide grid device with 16-channels and a frequency pitch of 100 GHz was fabricated under the conditions "C" shown on the above Table 1, wherein the array waveguide grid device has the laminations of the first and second submerge-preventing layers 5 and 6 as shown in FIG. 12. The bottom and top cladding layers 2 and 4 have a thickness of 15 micrometers. The first submerge-preventing layer 5 comprises the phospho-silicate glass layer of 3 micrometers in thickness. The second submerge-preventing layer 6 comprises the natural-silicate glass layer of 0.3 micrometers in thickness. The core 3 has a width of 5.5 micrometers and a height of 5.5 micrometers The core 3 is higher in refractive index than the bottom and top cladding layers 2 and 4. A difference in relative refractive index between the core 3 and the bottom and top cladding layers 2 and 4 is about 0.7 percents. Each of the bottom and top, cladding layers 2 and 4 comprises a boro-phospho-silicate glass layer, wherein a total dopant concentration of phosphorus and boron is 13.0 percents by weight. The stress is measured from the amount of bending the substrate. The measured stress is 3E6 Pa. The measured transmission center wavelength difference $\Delta\lambda$ is averaged at 0.01 nanometer in plane of wafer, where in-plane variation is suppressed within ±0.01 nanometer. In consideration of the accuracy in the total dopant concentration of phosphorus and boron, it is possible to suppress variation in transmission center wavelength difference $\Delta\lambda$ between different wafers.

Figure 13:
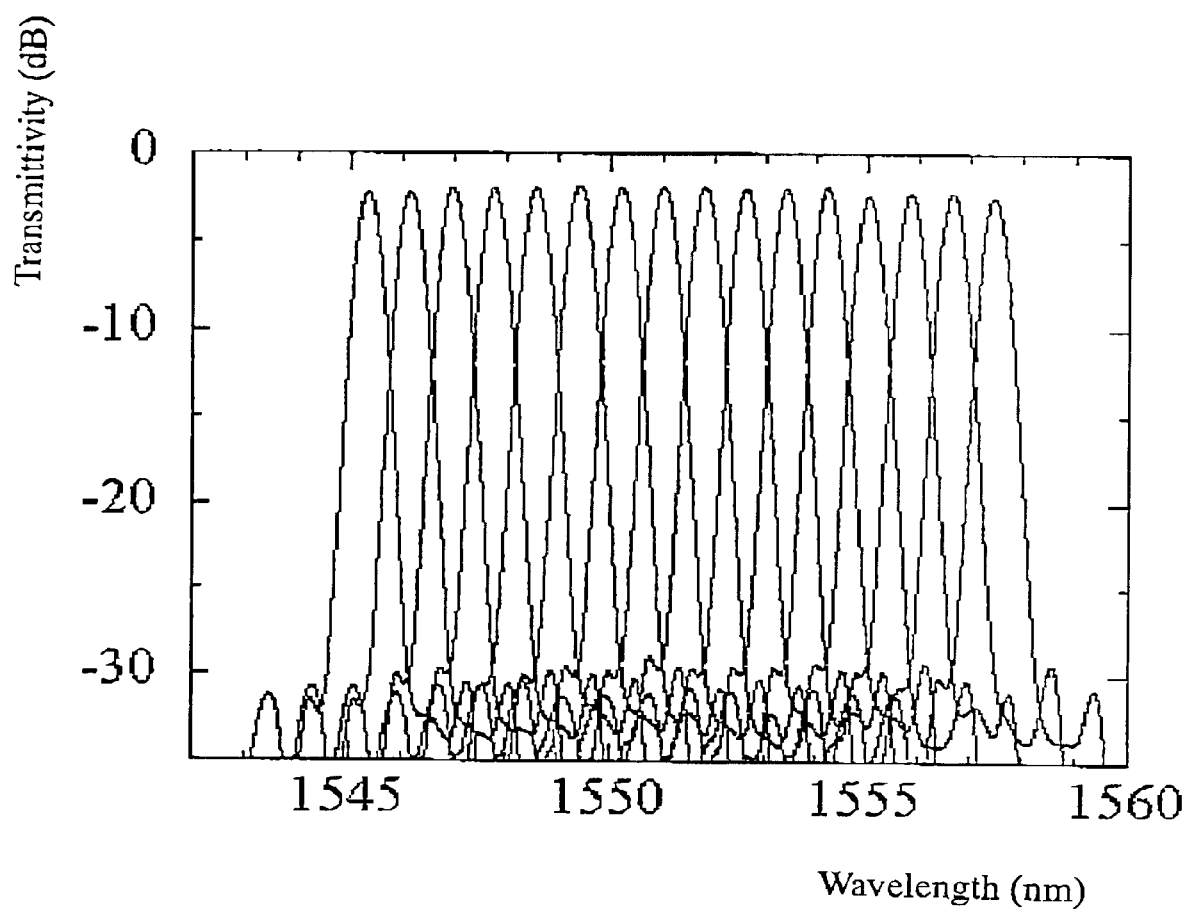
FIG. 13 is a diagram illustrative of variation in transitivity over wavelength of the array waveguide grid device with 16-channels and a frequency pitch of 100 GHz.

FIG 13 is a diagram illustrative of variation in transitivity over wavelength of the array waveguide grid device with 16-channels and a frequency pitch of 100 GHz. A cross-talk between adjacent two of the 16-channels is suppressed within −26 dB. An averaged polarization dependency loss is within 0.14 dB. Evaluation on reliability of the above novel optical waveguide device was made under high temperature and high humidity conditions. The above novel optical waveguide device was placed at a temperature of 85° C. and at a humidity of 90 percents for 1000 hours. No apparent change appeared on the optical waveguide device. A variation in optical propagation loss of the optical waveguide device was suppressed within 0.2 dB.

In accordance with the present invention, the first submerge-preventing silica-based layer is provided under the core and over the bottom cladding layer, wherein the first submerge-preventing silica-based layer is higher in softening temperature than the top cladding layer, and the first submerge-preventing silica-based layer is adjustable in both refractive index and stress, whereby the first submerge-preventing silica-based layer prevents the core from being submerged into the bottom cladding layer during the low temperature heat treatment. The first submerge-preventing silica-based layer also prevents the core from tilting. Further, the first submerge-preventing silica-based layer also prevents any displacement of the core from the original position. The first submerge-preventing silica-based layer improves the substrate in-plane uniformity in shape of the core: Consequently, the first submerge-preventing silica-based layer improves the device performances and also increases the yield of the device.

The second submerge-preventing silica-based layer is further provided under the first submerge-preventing silica-based layer and over the bottom cladding layer, wherein the second submerge-preventing silica-based layer is higher in softening temperature than the first submerge-preventing silica-based layer to form laminations of the first and second submerge-preventing silica-based layers, and the first and second submerge-preventing silica-based layers are adjustable in both refractive index and stress, whereby the first and second submerge-preventing silica-based layers prevent the core from being submerged into the bottom cladding layer during the low temperature heat treatment. The first and second submerge-preventing silica-based layers also prevent the core from tilting. Further, the first and second submerge-preventing silica-based layers also prevent any displacement of the core from the original position The first and second submerge-preventing silica-based layers also improve the substrate in-plane uniformity in shape of the core. Consequently, the first and second submerge-preventing silica-based layers improve the device performances and also increases the yield of the device.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims all modifications which fall within the spirit and scope of the present invention.

What is claimed is:

1. An optical waveguide device having a bottom cladding layer, a core and a top cladding layer, wherein a first submerge-preventing silica-based layer is further provided over said bottom cladding layer and under said core, and said first submerge-preventing silica-based layer is doped with at least one dopant and said first submerge-preventing silica-based layer is higher in softening temperature than said top cladding layer.

2. The optical waveguide device as claimed in claim 1, wherein said at least one dopant is selected from the group consisting of phosphorus and boron.

3. The optical waveguide device as claimed in claim 1, wherein said first submerge-preventing silica-based layer has a thickness in the range of 0.2 micrometers to 5 micrometers.

4. The optical waveguide device as claimed in claim 1, further composing a second submerge-preventing silica-based layer between said first submerge-preventing silica-based layer and said bottom cladding layer, wherein said second Submerge-preventing silica-based layer is doped with at least one dopant and said second submerge-preventing silica-based layer is higher in softening temperature than said first submerge-preventing silica-based layer.

5. The optical waveguide device as claimed in claim 4, wherein said at least one dopant is selected from the group consisting of phosphorus and boron.

6. The optical waveguide device as claimed in claim 4, wherein said second submerge-preventing silica-based layer has a thickness in the range of 0.1 micrometer to 0.3 micrometers.

7. The optical waveguide device as claimed in claim 1, wherein at least said top cladding layer comprises a first silica-based layer doped with at least one dopant.

8. The optical waveguide device as claimed in claim 7, wherein said at least one dopant is selected from the group consisting of phosphorus and boron.

9. The optical waveguide device as claimed in claim 7, wherein said first silica-based layer has a total weight concentration of said at least one dopant in the range of 6.2 percents by weight to 15 percents by weight and said first silica-based layer has a layer-stress of not more than 3E7 Pa.

10. The optical waveguide device as claimed in claim 7, wherein said first silica-based layer has a total weight concentration of said at least one dopant in the range of 8.8 percents by weight to 15 percents by weight and said first silica-based layer has a difference of not more than 0.03 nanometers in transmission center wavelength which depends upon polarization of said optical waveguide device.

11. The optical waveguide device as claimed in claim 7, wherein said first silica-based layer has a total weight concentration of said at least one dopant in the range of 12 percents by weight to 14 percents by weight and said first silica-based layer has a layer-stress of not more than 8.3E6 Pa.

12. The optical waveguide device as claimed in claim 7, wherein said first silica-based layer has a first weight concentration of phosphorus in the range of 4 percents by weight to 12 percents by weight, and a second weight concentration of boron in the range of 3 percents by weight to 11 percents by weight.

13. The optical waveguide device as claimed in claim 7, wherein each of said top and bottom cladding layers comprises said first silica-based layer.

14. The optical waveguide device as claimed in claim 1, wherein said optical waveguide device is an optical waveguide interferometer.

15. The optical waveguide device as claimed in claim 1, wherein said optical waveguide device is an array waveguide grid optical multiplexing and demultiplexing device which has an array waveguide region having both ends coupled with a first slab waveguide region in an input side and a second slab wave guide region in an output side.

16. The optical waveguide device as claimed in claim 1, wherein said optical waveguide-device is formed over a silicon substrate.

17. A method of forming an optical waveguide device comprising the steps of:
    forming a bottom cladding layer over a silicon substrate;
    forming a first submerge-preventing silica-based layer over said bottom cladding layer;
    selectively forming a core on said first submerge-preventing silica-based layer;
    forming a top cladding layer, which comprises a first silica-based layer doped with at least one dopant selected from the group consisting of phosphorus and boron, on said core and over said first submerge-preventing silica-based layer by a chemical vapor deposition method, wherein said first silica-based layer is lower in softening temperature than said first submerge-preventing silica-based layer; and
    subjecting said first silica-based layer to a heat treatment in the rage of 80–1000° C.

18. The method as claimed in claim 17, wherein said bottom cladding layer also comprises said first silica-based layer.

19. The method as claimed in claim 17, wherein a total dopant concentration of said first silica-based layer is in the range of 6.2 percents by weight to 15 percents by weight, and said first silica-based layer has a layer-stress of not more than 3F7 Pa.

20. The method as claimed in claim 17, wherein a total dopant concentration of said first silica-based layer is in the range of 8.8 percents by weight to 15 percents by weight, and said first silica-based layer has a difference of not more than 0.03 nanometers in transmission center wavelength which depends upon polarization of said optical waveguide device.

21. The method as claimed in claim 17, further comprising the step of: after said bottom cladding layer has been formed forming a second submerge-preventing silica-based layer on said bottom cladding layer before said first submerge-preventing silica-based layer is then formed on said second submerge-preventing silica-based layer, wherein said second submerge-preventing silica-based layer is higher in softening temperature than said first submerge-preventing silica-based layer.

22. The method as claimed in claim 17, wherein said first silica-based layer has a first weight concentration of phosphorus in the range of 4 percents by weight to 12 percents by weight, and a second weight concentration of boron in the range of 3 percents by weight to 11 percents by weight.

23. The method as claimed in claim 17, wherein said first silica-based layer is grown at a temperature of 400° C. and said heat treatment is carried out at a temperature of 880° C., and said total dopant concentration of said first silica-based layer is in the range of 12 percents by weight to 14 percents by weight.

24. The method as claimed in claim 17, wherein each of said top and bottom cladding layers is formed by an atmospheric pressure chemical vapor deposition method by decomposing tetraethylolsosilicate with ozone.

25. An optical waveguide device having a bottom cladding layer, a core and a top cladding layer,
    wherein at least said top cladding layer comprises a first silica-based layer doped with at least one dopant so that said first silica-based layer has a total dopant concentration in the range of 8.8 percents by weight to 15 percents by weight, and said first silica-based layer has a difference of not more than 0.03 nanometers in transmission center wavelength which depends upon polarization of said optical waveguide device.

26. The optical waveguide device as claimed in claim 25, wherein said bottom cladding layer is higher in softening temperature than said top cladding layer.

27. The optical waveguide device as claimed in claim 25, wherein said at least one dopant is selected from the group consisting of phosphorus and boron.

28. The optical waveguide device as claimed in claim 27, wherein a total concentration of phosphorus and boron of said firs silica-based layer is in the range of 12 percents by weight to 14 percents by weight, and said first silica-based layer has a layer-stress of not more than 8.3E6 Pa.

29. The optical waveguide device as claimed in claim 25, wherein said bottom cladding layer comprises a second silica-based layer doped with phosphorus.

30. The optical waveguide device as claimed in claim 29, wherein said second silica-based layer is further doped with germanium in addition to phosphorus.

31. The optical waveguide device as claimed in claim 25, wherein said optical waveguide device is an, optical waveguide interferometer.

32. The optical waveguide device as claimed in claim 25, wherein said optical waveguide device is an array waveguide grid optical multiplexing and demultiplexing device which has an array waveguide region having both ends coupled with a first slab waveguide region in an input side and a second slab waveguide region in an output side.

33. A method of forming an optical waveguide device comprising the steps of:

forming a bottom cladding layer over a silicon substrate;

selectively forming a core on said bottom cladding layer;

forming a top cladding layer, which comprises a first silica-based layer doped with at least one dopant selected from the group consisting of phosphorus and boron, on said core and over said bottom cladding layer by a chemical vapor deposition method; and subjecting said first silica-based layer to a heat treatment in the range of 800–1000° C.

34. The method as claimed in claim 33, wherein said bottom cladding layer also comprises said first silica-based layer.

35. The method as claimed in claim 33, wherein said first silica-based layer has a total dopant concentration in the range of 6.2 percents by weight to 15 percents by weight, and said first silica-based layer has a layer-stress of not more than 3E7 Pa.

36. The method as claimed in claim 33, wherein said first silica-based layer has a total dopant concentration in the range of 8.8 percents by weight to 15 percents by weight, and said first silica-based layer has a difference of not more than 0.03 nanometers in transmission center wavelength which depends upon polarization of said optical waveguide device.

37. The method as claimed in claim 33, wherein said first silica-based layer has a first weight concentration of phosphorus in the range of 4 percents by weight to 12 percents by weight, and a second weight concentration of boron in the range of 3 percents by weight to 11 percents by weight.

38. The method as claimed in claim 33, wherein said first silica-based layer is grown at a temperature of 400° C. and said heat treatment is carried out at a temperature of 880° C., and said total dopant concentration of said first silica-based layer is in the range of 12 percents by weight to 14 percents by weight.

39. The method as claimed in claim 33, wherein each of said top and bottom cladding layers is formed by an atmospheric pressure chemical vapor deposition method by decomposing tetraethylolsosilicate with ozone.

40. The optical waveguide device as claimed in claim 33, wherein said bottom cladding layer comprises a second silica-based layer doped with phosphorus.

41. The optical waveguide device as claimed in claim 40, wherein said second silica-based layer is further doped with germanium in addition to phosphorus.

* * * * *